(12) United States Patent
Johnson et al.

(10) Patent No.: US 8,164,758 B2
(45) Date of Patent: Apr. 24, 2012

(54) INTERNAL INSPECTION SYSTEM AND METHOD

(75) Inventors: Stanley P. Johnson, Avon, CT (US); Phillip D. Bondurant, Covington, WA (US)

(73) Assignee: Quest Metrology, LLC, Kent, WA (US)

( * ) Notice: Subject to any disclaimer, the term of this patent is extended or adjusted under 35 U.S.C. 154(b) by 384 days.

(21) Appl. No.: 12/459,983

(22) Filed: Jul. 10, 2009

(65) Prior Publication Data

US 2010/0110448 A1    May 6, 2010

Related U.S. Application Data

(60) Provisional application No. 61/134,487, filed on Jul. 10, 2008.

(51) Int. Cl.
*G01B 11/30* (2006.01)

(52) U.S. Cl. ............. 356/601; 356/237.2; 356/613; 356/399; 250/559.42; 250/559.24; 250/216

(58) Field of Classification Search .......... 250/559.42, 250/559.22, 559.12–559.15, 234, 216, 221, 250/559.24; 356/601, 613, 237.1, 638–640, 356/399–401
See application file for complete search history.

(56) References Cited

U.S. PATENT DOCUMENTS

| | | |
|---|---|---|
| 4,315,688 A | 2/1982 | Pryor |
| 4,598,998 A | 7/1986 | Kamei et al. |
| 5,214,856 A * | 6/1993 | Masselink ............... 33/199 R |
| 5,521,707 A | 5/1996 | Castore et al. |
| 5,571,222 A * | 11/1996 | Ludwig ...................... 73/162 |
| 5,712,706 A | 1/1998 | Castore et al. |
| 6,404,912 B1 | 6/2002 | Lehnen et al. |
| 7,490,411 B2 * | 2/2009 | Matsumiya et al. ...... 33/199 R |

OTHER PUBLICATIONS

D. Varshneya & L.A. Jeffers, "Fiber optic internal thread probe", Optical Engineer, vol. 25, No. 5., May 1986, pp. 682-687.
Tyler C. Folsom & Phillip D. Bondurant, "Non-Contact Internal Thread Inspection", SAE Technical Paper 1999-01-3434, Aerospace Automated Fastening Conference & Exposition, Nashville, Tennessee, Oct. 5-7, 1999.
Lyle H. McCarthy, "Laser Inspects Internal Threads, Reduces Manufacturing Costs", Design News, Jan. 23, 1989, Cahners Publishing Company.

\* cited by examiner

*Primary Examiner* — Gregory J Toatley
*Assistant Examiner* — Iyabo S Alli
(74) *Attorney, Agent, or Firm* — Christensen O'Connor Johnson Kindness PLLC

(57) ABSTRACT

In some embodiments, an inspection system for measuring at least a portion of the threaded surface of an internally threaded component includes at least one measuring probe, a component retention device that allows positioning of the internally threaded component relative to the measuring probe and a processing device in signal communication with the measuring probe to receive threaded surface data therefrom.

20 Claims, 17 Drawing Sheets

INTERNAL INSPECTION SYSTEM AND METHOD

RELATED APPLICATIONS

This application is related to and claims priority from U.S. Provisional Patent Application Ser. No. 61/134,487 filed Jul. 10, 2008 entitled "Internal Inspection System and Method for implementing same", the contents and disclosure of which is incorporated herein by reference in its entirety. Additionally, the invention disclosed herein is related to U.S. application Ser. No. 12/383,141 filed Mar. 20, 2009 entitled "Inspection System and Method for implementing same," the contents and disclosure of which is incorporated herein by reference in its entirety.

FIELD OF THE INVENTION

This disclosure relates generally to a method and system for inspecting components and more particularly to a method and system for optically inspecting the internal physical characteristics of internally threaded components, such as nuts and other internally threaded components having varied configurations.

BACKGROUND OF THE INVENTION

As society becomes increasingly reliant upon technology, mechanical and electromechanical systems, such as aircraft, automobiles, weapons systems and power systems, are called upon to perform an ever increasing number of functions. One downside to this is that, in some situations, a failure of a single threaded component in the system may cause a catastrophic failure of the entire system possibly resulting in the loss of millions of dollars and hundreds of lives. In an attempt to reduce the probability of a catastrophic systems failure, critical and some non-critical systems are required to satisfy predetermine operating tolerances before they may be used. As such, key threaded components within these systems, i.e. threaded components whose failure may cause a catastrophic system failure such as internally threaded rings, nuts and/or plain and threaded ring gages, must also satisfy operating tolerances. If a threaded component fails to satisfy these required design tolerances and/or performance specifications, a degradation of system performance and/or a total system failure may occur resulting in damage to the system and/or injury/loss of life to an operator and/or bystander.

Current systems used for inspecting physical characteristics of an internally threaded component employ an attribute inspection approach that measures the characteristics of the threaded component via a contact measurement technique. This technique typically uses GO and/or NO GO threaded work plugs that are calibrated to specifications. The internal thread size measurement are conducted via GO and/or NO GO working plugs and gages. Unfortunately, this technique only measures the functional size and does not protect and ensure the dimensional integrity of product design limits and because this approach is attribute gagging and is dependent upon human interaction, this technique has the disadvantage of being time consuming, subjectively inaccurate and unreliably repeatable for tight operating tolerances over multiple measurements. Accordingly, threaded components having dimensionally non-conforming characteristics are allowed to pass inspections. Moreover, because these systems use contact measuring techniques, there is a considerable wear factor on the measuring instruments, requiring the GO, NO GO, threaded working plugs and variable internal gauging elements to be inspected and replaced often.

SUMMARY OF THE INVENTION

In some embodiments, an inspection system for measuring at least a portion of the threaded surface of an internally threaded component includes at least one measuring probe, a processing device and a component retention device. Each measuring probe includes an emitter and a receiver and is sized and shaped to be positionable adjacent to at least a portion of the threaded surface at an offset distance. The emitter is configured to emit electromagnetic energy onto the threaded surface to generate reflected electromagnetic energy off of the threaded surface. The receiver is configured to receive at least a portion of the reflected electromagnetic energy and generate threaded surface data. The processing device is in signal communication with the measuring probe to receive the threaded surface data and process the threaded surface data to determine one or more physical characteristics of the threaded surface. The component retention device is configured to have at least one active state and at least one inactive state. In the active state, the component retention device secures the internally threaded component in a fixed position relative to at least one measuring probe. In the inactive state, the component retention device allows the internally threaded component to move in at least one plane. The component retention device is controllably actuated between the active and inactive states.

In various embodiments, a method for measuring the threaded surface of an internally threaded component uses an inspection system having a measuring probe. The measuring probe has an emitter and a receiver and is sized and shaped to be positioned adjacent to at least a portion of the threaded surface at an offset distance. The emitter is configured to emit electromagnetic energy onto the threaded surface to generate reflected electromagnetic energy off of the threaded surface. The receiver is configured to receive at least a portion of the reflected electromagnetic energy and generate threaded surface data. The method of these embodiments includes activating a component retention device to secure the internally threaded component in a fixed position relative to the measuring probe; positioning the measuring probe inside a cavity of the internally threaded component; deactivating the component retention device to cause the internally threaded component to be re-positioned relative to the measuring probe such that a desired offset distance and an alignment are formed between the measuring probe and the threaded surface of the internally threaded component re-activating the component retention device to secure the new position of the internally threaded component relative to the measuring probe; operating the inspection system to generate threaded surface data about at least a portion of the threaded surface of the internally threaded component; and processing the threaded surface data to generate one or more physical characteristics of at least a portion of the threaded surface.

The present disclosure also includes embodiments of a method of establishing a desired standoff distance between and aligning at least a portion of the threaded surface of an internally threaded component and a measuring probe of an inspection system in order to allow at least one physical characteristic of the threaded surface to be determined. The measuring probe includes at least one electromagnetic energy emitter and at least one electromagnetic energy receiver. The inspection system includes a measuring probe collar associated with the measuring probe and being movable relative to the measuring probe. At least a portion of the measuring probe collar has a width that is equal to the desired standoff distance. The method of these embodiments includes securing the position of the internally threaded component relative to the measuring probe; positioning the measuring probe inside a cavity of the internally threaded component; positioning the measuring probe collar at least partially between the internally threaded component and the measuring probe; allowing the internally threaded component to move into contact with the measuring probe collar and align at least a portion of the threaded surface of the internally threaded component with the measuring probe; re-securing the position of the internally threaded component relative to the measuring probe thereby establishing the desired standoff distance and alignment between at least a portion of the threaded surface of the internally threaded component and the measuring probe; and positioning the measuring probe collar away from at least one electromagnetic energy emitter and receiver of the measuring probe thereby allowing the inspection system to determine at least one physical characteristic of the threaded surface of the internally threaded component.

BRIEF DESCRIPTION OF THE DRAWING FIGURES

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

An exemplary embodiment is described herein by way of illustration as may be applied to the measurement and inspection of internally threaded gages, products and components, such as nuts and other internally threaded components. However, while an exemplary embodiment is shown and described hereinbelow, it should be appreciated by those skilled in the art that the invention is not limited to the embodiment(s) and application(s) as described herein, but also to any component and/or measurement where accuracy in tolerance measurement is critical, such as gears, internal bores, integral plain cylindrical bores, internal threads, internal diameters and/or material composition and/or strength. Moreover, those skilled in the art will appreciate that a variety of potential implementations and configurations are possible within the scope of the disclosed embodiments.

In accordance with an embodiment of the invention, an inspection system is provided and may be used to inspect and measure internal characteristics of an internally threaded product (and/or gage, plain and/or threaded ring gage) using a measuring device, such as an optical triangulation probe which uses a Laser to map the surface being measured. In fact, the internal inspection of this embodiment may be used to inspect and measure the physical characteristics of most apparatus or structures having an internal surface and/or enclosure and is not limited to threaded/non-threaded products, working GO & NO GO ring gages and/or master threaded rings. In accordance with this embodiment of the present invention, the desired internal characteristics may include, but are not limited to, the Lead, Flank Angle (Included), Flank Angle (Leading), Flank Angle (Trailing), Pitch Diameter, Taper, Minor Diameter, Major Diameter, Major Diameter Clearance, Out-of-Round and/or Functional Size.

Figure 1:
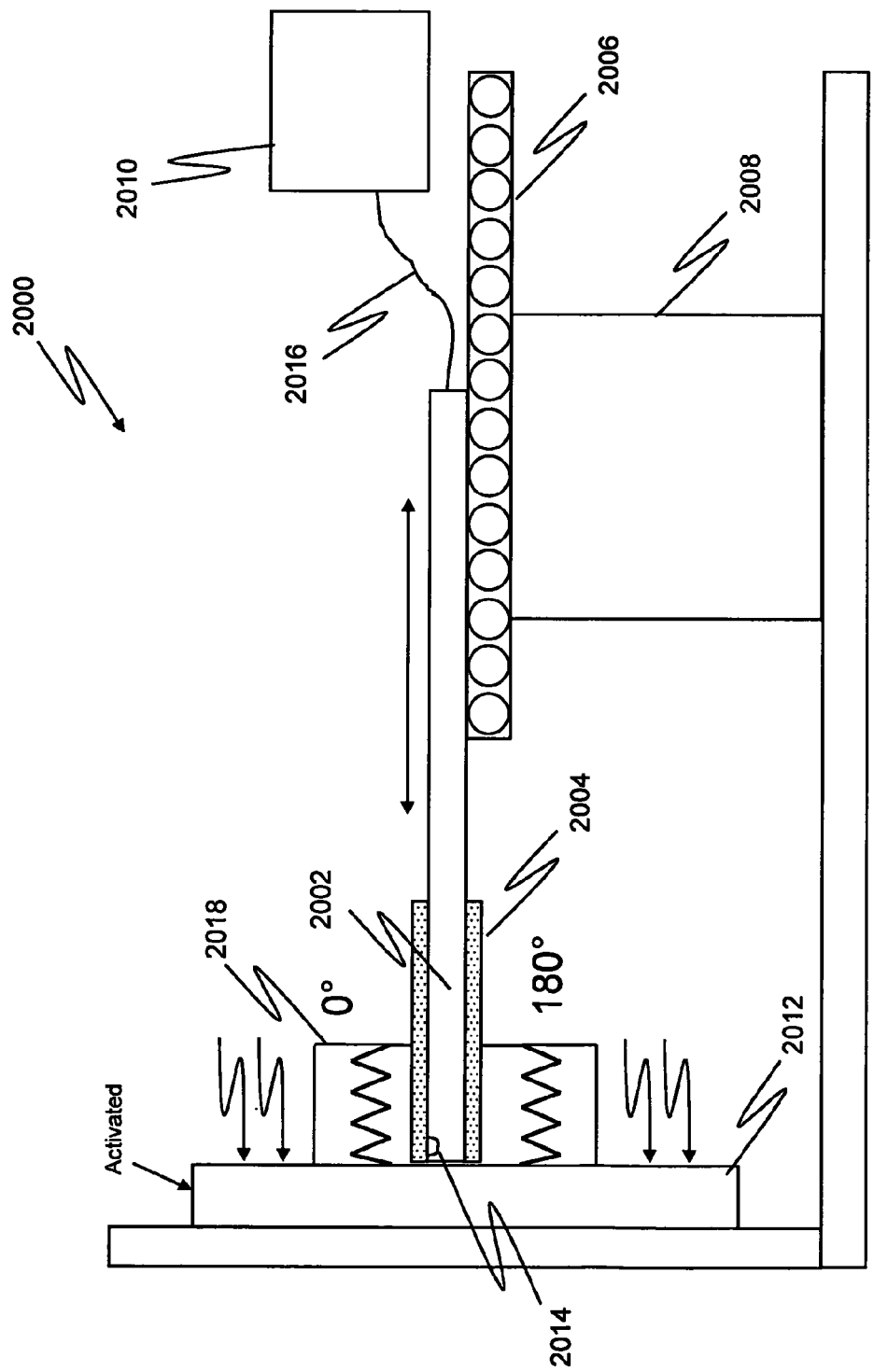
FIG. 1 shows a side view of an internal inspection system in accordance with one embodiment of the invention.

Referring to FIG. 1, one embodiment of an internal inspection system 2000 is shown and includes a measuring probe 2002, a measuring probe collar 2004, a measuring probe locating device 2006, a measuring probe support device 2008, a processing device 2010 and a product retention device 2012. Although, the product retention device 2012 is illustrated and referred to herein as an electromagnetic device which is easily switched on and off to hold and release a product being inspected, the product retention device 2012 may be any type of product retention device 2012 suitable to the desired end purpose. For example, the product retention device 2012 may retain the product via friction, suction, clamps, clips, etc. This alternative type of product retention device could, for example, be useful in securely holding a non-metallic (plastic, ceramic, etc.) product. It is also contemplated that the product may simply rest on a surface without the aid of a retention device while being inspected.

In accordance with this embodiment of the invention, the measuring probe 2002 is shown as being an optical triangulation type probe having a Laser emitter/receiver portion 2014 that is capable of emitting and receiving a Laser beam with a measurement resolution of about 20 millionths of an inch and which is configured to emit a Laser beam having a spot size ranging from about one ten thousandths of an inch to about five ten thousandths of an inch. It should be appreciated that the resolution may be based, at least in part, upon the mirror configuration within the optical triangulation probe. The measuring probe 2002 may be communicated with the processing device 2010 via a fiber optic cable 2016 to communicate data (such as a surface map data and/or image data (shadow or picture)) between the measuring probe 2002 and the processing device 2010. It is contemplated that a signal (data) conditioning circuit may be associated (internally or externally) with the processing device 2010 to condition the signal before and/or after receipt of the data by the processing device 2010. Additionally, it is contemplated that the data may be transmitted to the processing device 2010 via a wireless method/device or via a hard-wired connection where the data is converted into electrical signals prior to being transmitted to the processing device 2010. Furthermore, the measuring probe collar 2004 may be provided to cover the measuring probe 2002 to ensure that there is a sufficient standoff distance between the measuring probe 2002 and the surface of the product being measured. It should be appreciated that although the measuring probe 2002 is shown and described herein as being an optical triangulation type probe that uses a Laser source, any type of measuring device which emits electromagnetic energy (all along the electromagnetic spectrum) and which is suitable to the desired end purpose may be used, such as non-Laser collimated light, optical, borescope, MASER, electron beam, etc.

The exemplary illustrated measuring probe locating device 2006 is supported by the measuring probe support device 2008 such that the measuring probe locating device 2006 can move the measuring probe 2002 into and out of the internal space of the product being measured. This measuring probe locating device 2006, which is disclosed herein as a ball slide unit, but which may be any locating device suitable to the desired end purpose (such as, for example, an electric or pneumatic positionable device), allows the measuring probe 2002 to be precisely located within the product and adjacent the surface being measured where the measuring probe locating device 2006 may be precisely controlled via the processing device 2010 or some other (external or internal) device. The product retention device 2012 is provided to securely hold and position the product being measured.

Figure 2:
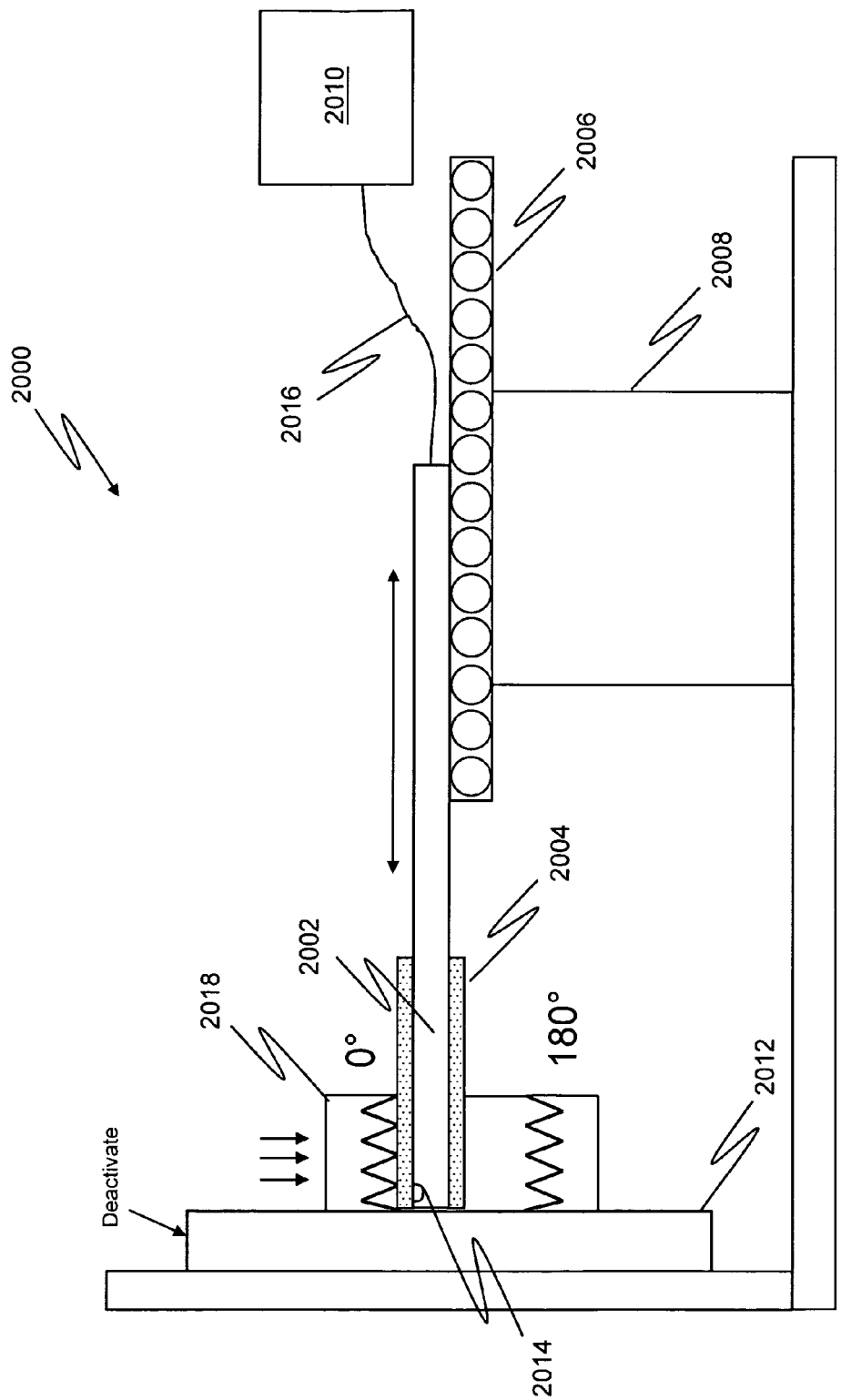
FIG. 2 shows a side view of an internal inspection system of FIG. 1.

In accordance with one embodiment of the present invention, the internal inspection system 2000 operates as follows. Referring again to FIG. 1, a threaded product/component 2018 (such as an internally threaded product or threaded ring) is positioned adjacent the product retention device 2012, where the component 2018 may be positioned via hand or via an automated device. The product retention device 2012 is operated to activate an electromagnet to magnetically hold the component 2018 stationary and securely against the surface of the electromagnet of the product retention device 2012. The measuring probe 2002 with the measuring probe collar 2004 positioned to cover the Laser emitter/receiver portion 2014 of the measuring probe 2002, is positioned within the cavity of the component 2018 (or area of the product/component to be measured) to be adjacent the product surface to be measured. This initial component orientation is referred to as the 0° position. Referring to FIG. 2, once the measuring probe 2002 is positioned within the cavity of the product 2018, the product retention device 2012 is operated to cause the electromagnet to be deactivated (i.e. de-magnetized). This allows the product 2018 to be positioned onto the measuring probe collar 2004 of the measuring probe 2002. Accordingly, the product becomes 'centered' onto the measuring probe collar 2004 to be adjacent the product retention device 2012 (electromagnet).

Figure 3:
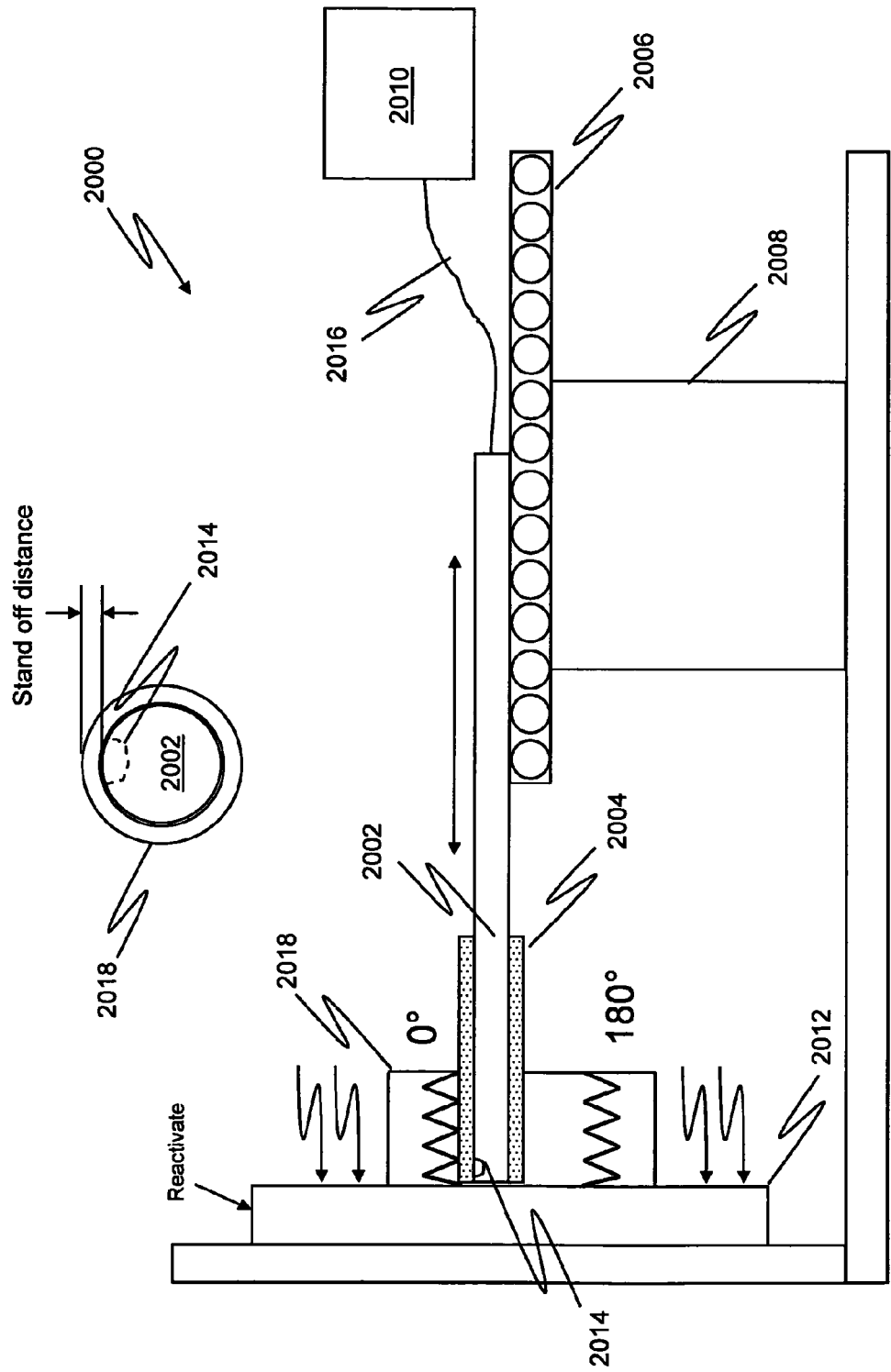
FIG. 3 shows a side view of an internal inspection system of FIG. 1.
Figure 4:
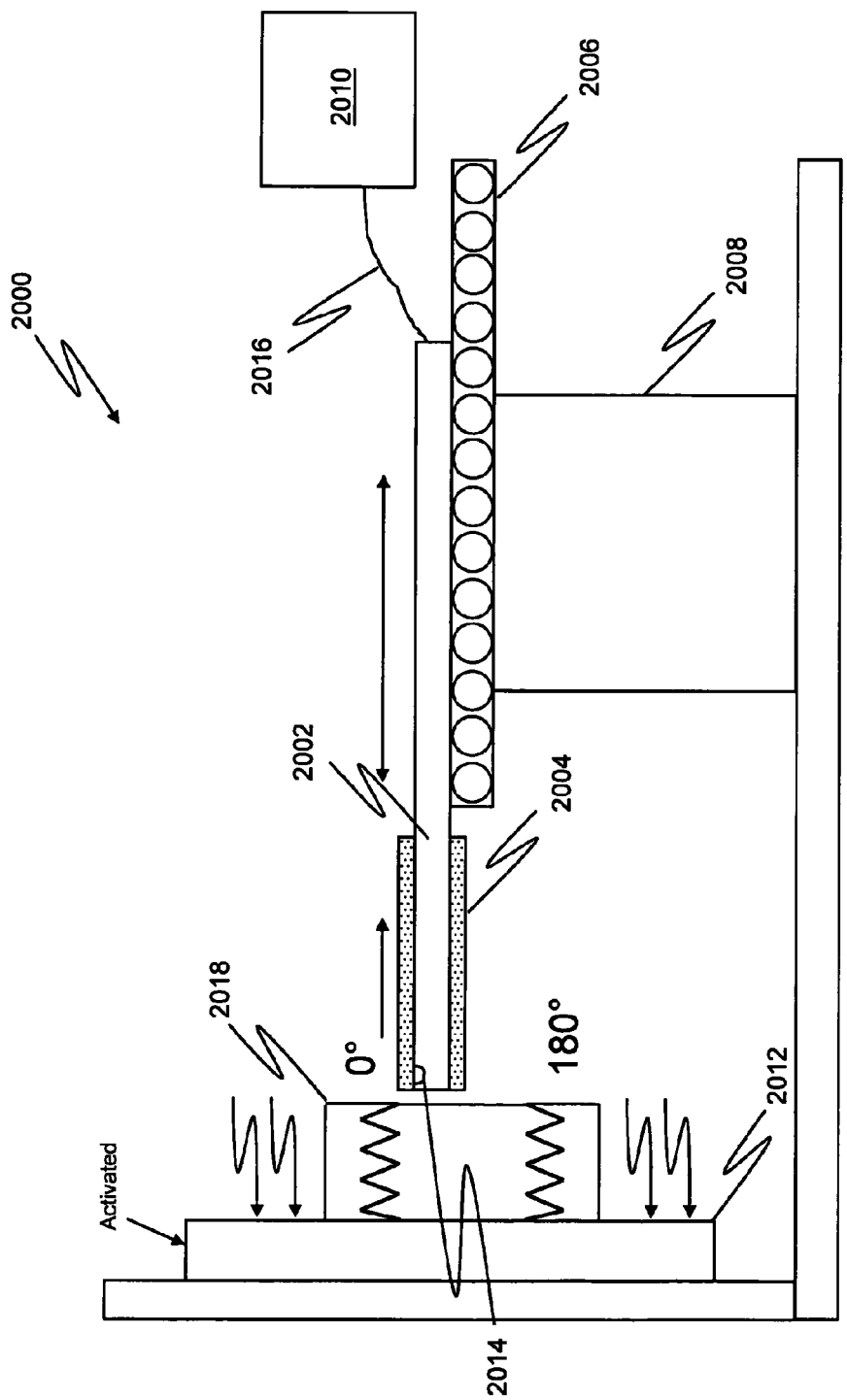
FIG. 4 shows a side view of an internal inspection system of FIG. 1.
Figure 5A:
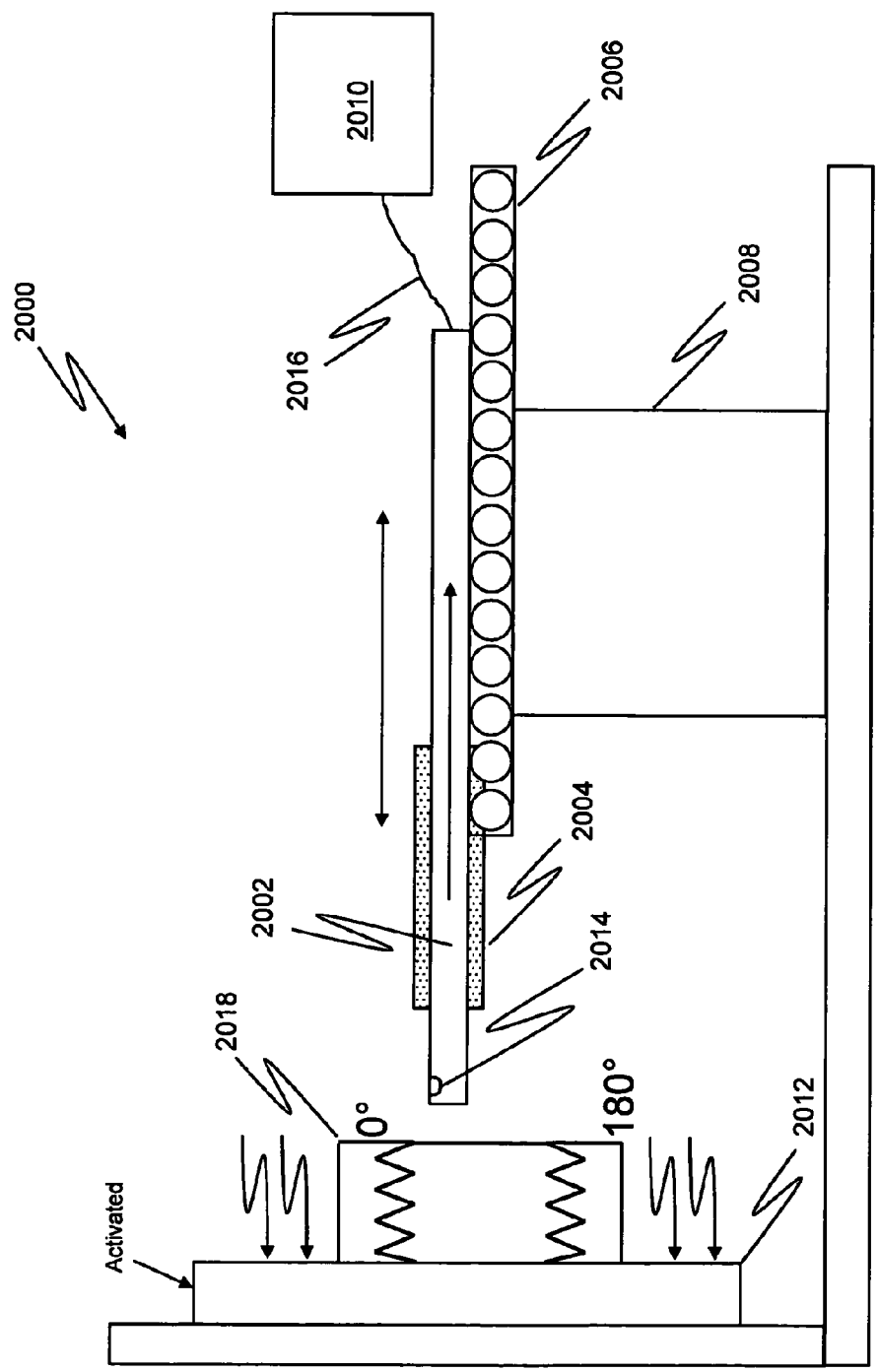
FIG. 5a shows a side view of an internal inspection system of FIG. 1.

The product retention device 2012 is then reactivated to cause the electromagnet to magnetize causing the product 2018 to be securely held in place against the electromagnet of the product retention device 2012 as shown in FIG. 3. At this point the measuring probe 2002 may be withdrawn from the cavity of the product 2018, as shown in FIG. 4 and the measuring probe collar 2004 may be positioned (at least in part) away from the Laser emitter/receiver portion 2014 to allow the Laser emitter/receiver portion 2014 to emit/receive Laser light, as shown in FIG. 5*a*. It should be appreciated that the width of the collar 2004 may be sized to provide a standoff distance between the product surface to be measured and the measuring probe 2002 that is sufficient enough to allow the measuring probe 2002 to emit Laser light and receive the reflected (and/or refracted) Laser light from the surface of the component 2018 being sensed. This standoff distance may be dependent (at least in part) on the mirrors in the optical triangulation probe and/or the product itself. For example, in one embodiment the standoff distance may be equal to the distance between the minor diameter of the product and the measuring probe 2002.

Figure 5B:
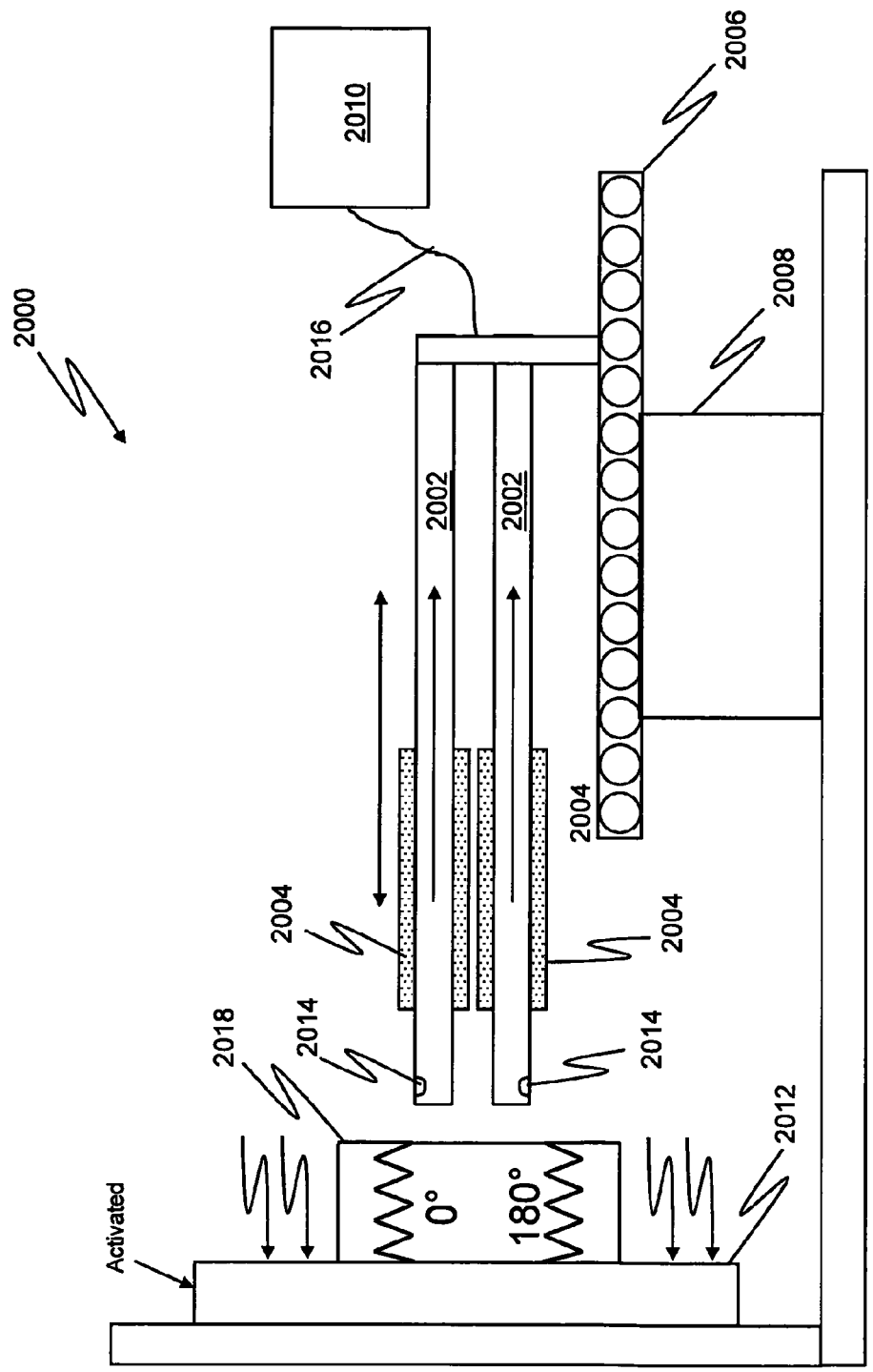
FIG. 5b shows a side view of an alternative embodiment of an internal inspection system having multiple measuring probes.

It is contemplated that (as described above) the measuring probe 2002 may be removed from the cavity (at least in part) prior to removing the measuring probe collar 2004. Or the measuring probe collar 2004 may be removed (at least in part) while the measuring probe 2002 is still positioned within the cavity. Or the measuring probe 2002 may not include a measuring probe collar 2004, but rather that the standoff distance be determined and implemented by determining the location of the probe relative to the surface being measured and adjusting the standoff distance by moving either the probe 2002, the component 2018 or both of the probe 2002 and the component 2018. In accordance with one embodiment of the invention, this allows the proper positioning of the product 2018 relative to the measuring probe 2002. It is contemplated that the positioning of the measuring probe 2002 and/or measuring probe collar 2004 may be accomplished (at least in part) using the measuring probe locating device 2006 or a separate positioning device controlled in whole or in part via the processing device 2010 or via any other device/method suitable to the desired end purpose. It is also contemplated that multiple measuring probes 2002 (or one measuring probe 2002 having multiple emitter/receiver portions 2014) may be implemented and may be used to measure both the 0° position and the 180° position, as shown in FIG. 5*b*. It is further contemplated that one or more probes (by rotating the probes in an annular fashion or by arranging the probes as a annular ring) may be used to simultaneously measure 360° (i.e. 0° to )360° of the surface to generate a complete (or partial) surface map of the internal surface. In this case, the standoff distance may be determined and implemented as above or the probes 2002 may be positioned relative to each other for the proper standoff distance for a particular product 2018.

Figure 6:
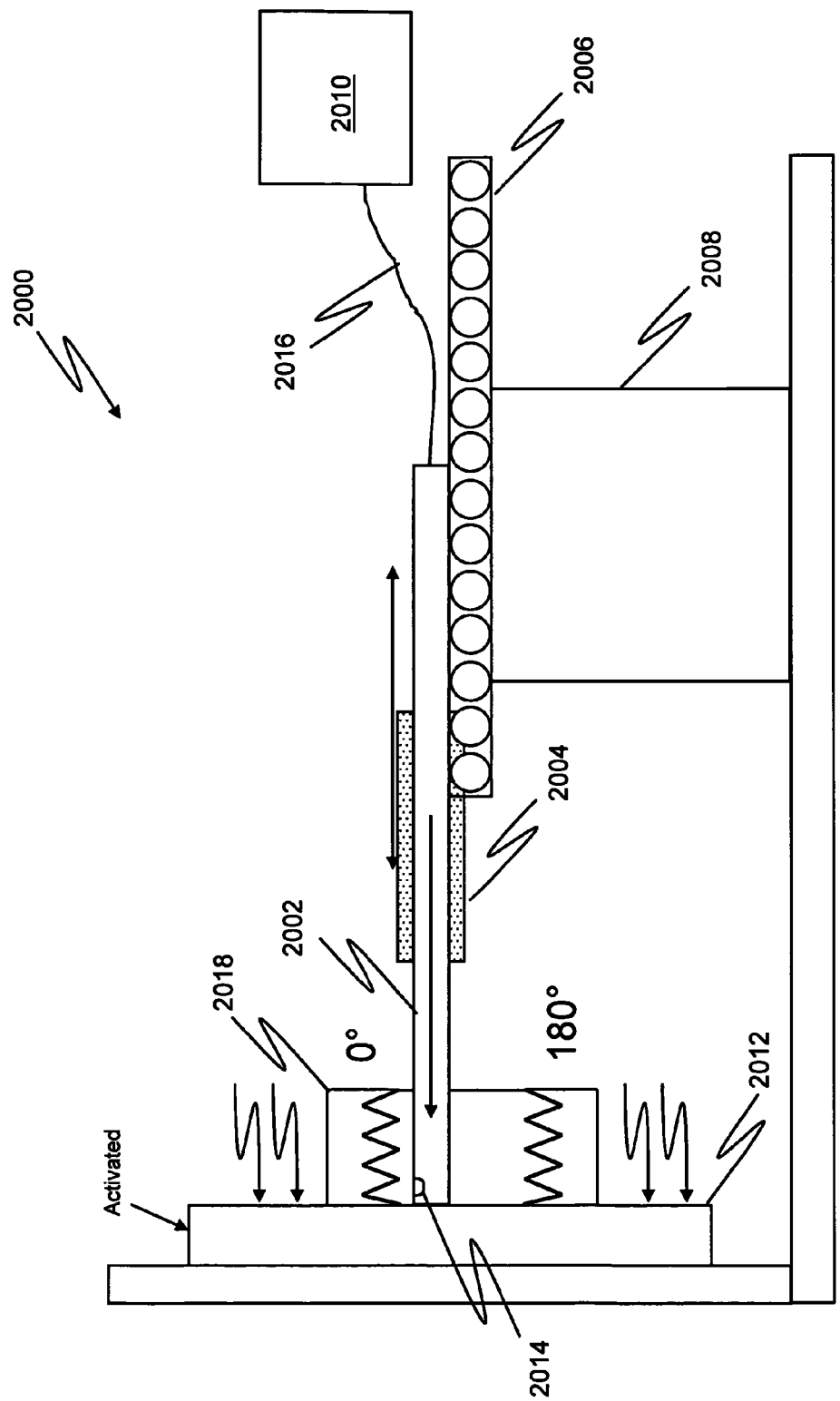
FIG. 6 shows a side view of an internal inspection system of FIG. 1.
Figure 7A:
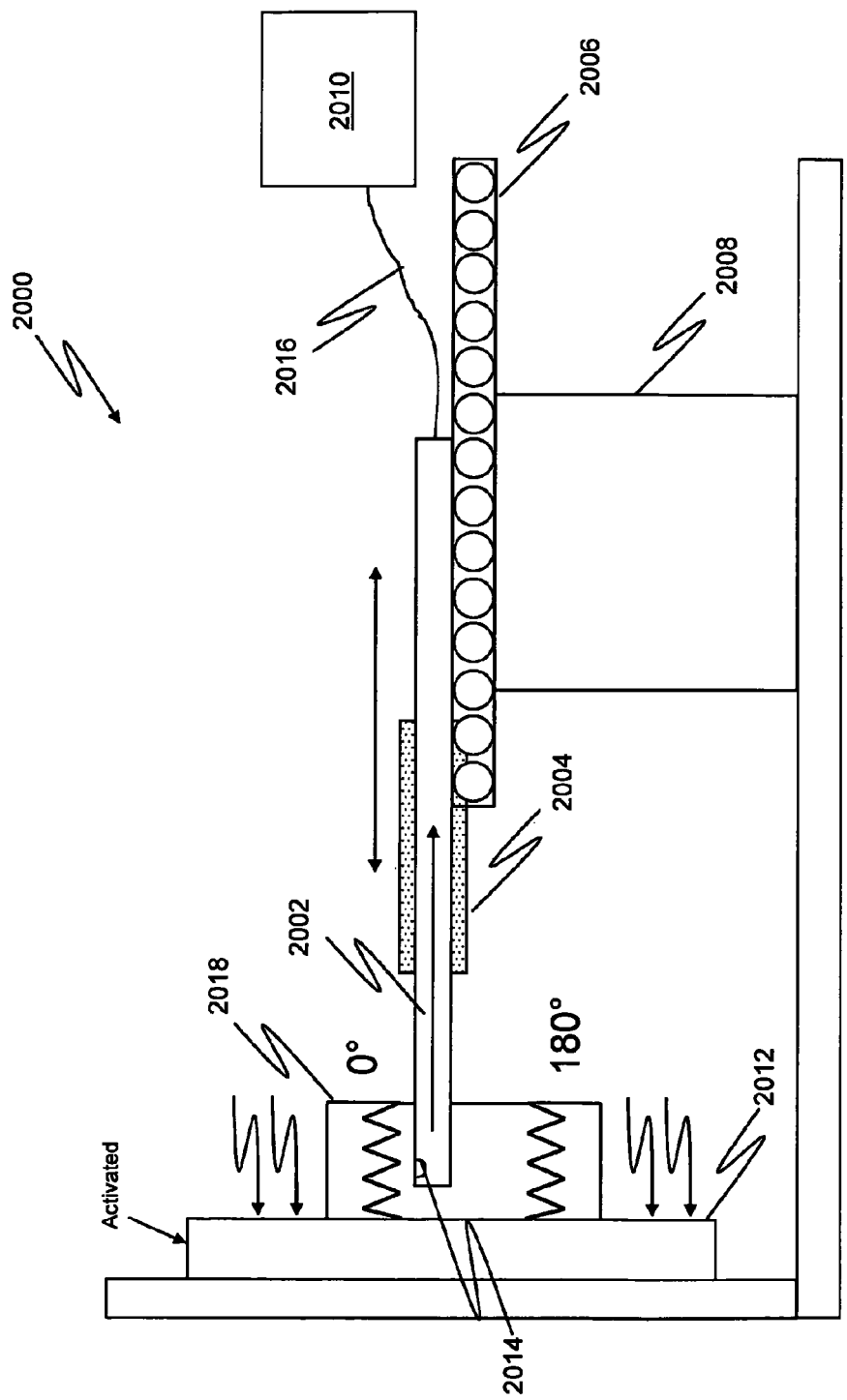
FIG. 7a shows a side view of an internal inspection system of FIG. 1.
Figure 7B:
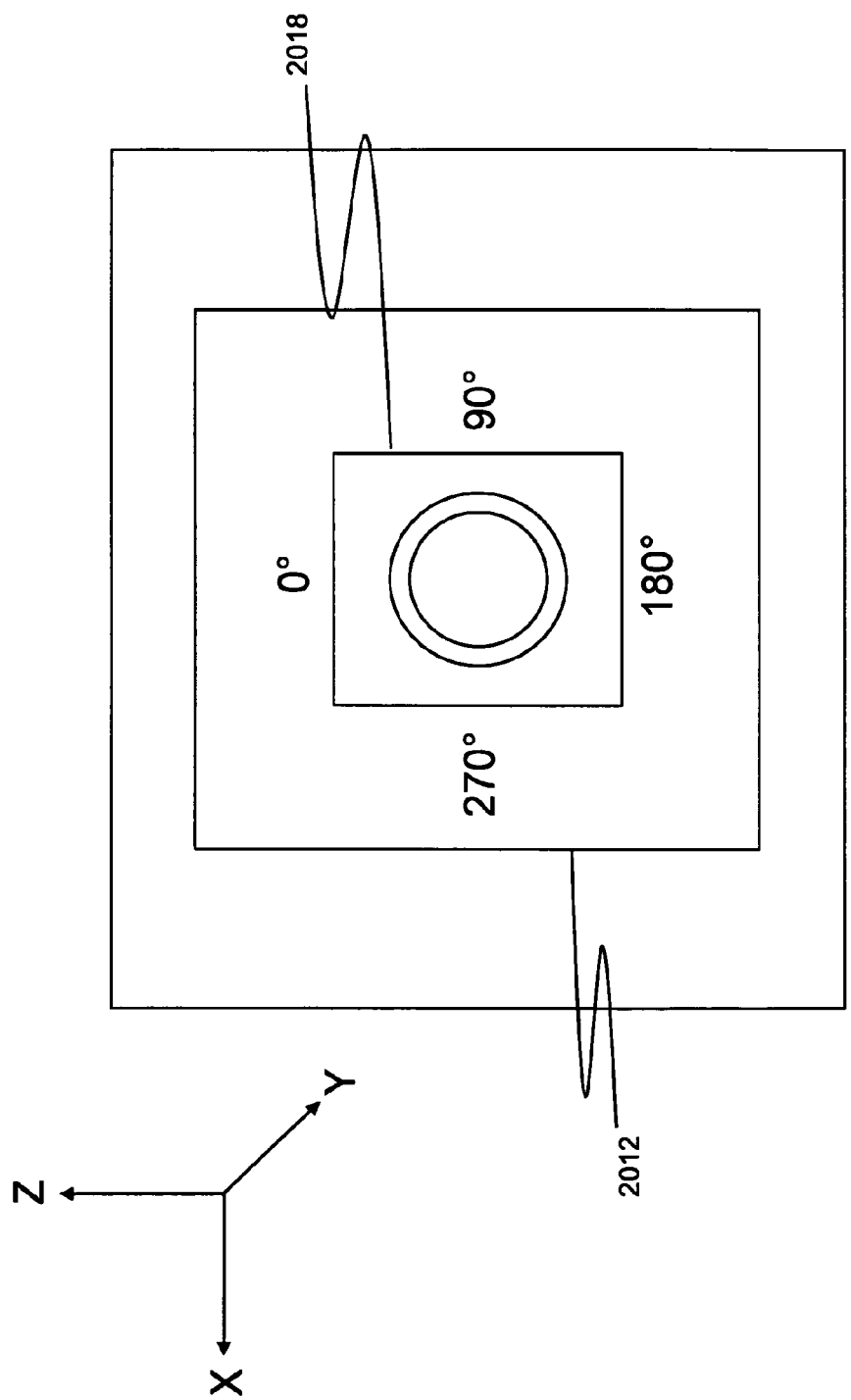
FIG. 7b shows a front view of a component associated with the internal inspection system of FIG. 1.

Referring to FIG. 6, the measuring probe 2002 of this embodiment is positioned within the cavity of the product 2018 to be adjacent the surface to be measured and the measuring probe 2002 is operated such that the Laser light illuminates the surface of the product 2018 being measured. Typically, the measuring probe 2002 is initially positioned adjacent to the face of the product retention device 2012 so that the entire internal product surface can be measured as the measuring probe 2002 is being withdrawn from the cavity. However, it is contemplated that the measuring probe 2002 may be positioned partially within the cavity so that only a desired portion of the surface is measured. The measuring probe 2002 may then be withdrawn from the cavity (i.e. through the cavity toward the measuring probe locating device 2006) while the measuring probe 2002 is illuminating the surface being measured with Laser light, as shown in FIG. 7a. The Laser light that is incident on the surface being measured 'bounces' off of the surface and is directed toward the measuring probe 2002 where at least a portion of the reflected Laser light is received by the probe 2002 as the measuring probe 2002 traverses the cavity. It should be appreciated that this measurement may also be accomplished by starting at the outer most point of the cavity and illuminating the surface as the measuring probe 2002 traverses the cavity toward the product retention device 2012. This Laser light received by the measuring probe 2002 allows a profile of the surface being measured (such as an internal threaded surface) to be generated as the measuring probe 2002 is pulled through the cavity of the product 2018 at a constant and/or variable speed which rate may be dependent and responsive to the desired data, such as a desired image quality/resolution. This process may then be repeated for other orientations of the product 2018 as desired, for example the 90°, 180° and/or 270° positions, as shown in FIG. 7b.

It should be appreciated that in one embodiment, the optical triangulation probe that is being used as the measuring probe 2002 may operate by emitting a Laser beam which is incident upon the surface being measured. The reflection (or a portion of the reflection) of the Laser beam from the surface is received by the measuring probe 2002 thus allowing for the generation of a surface profile image (such as a shadow image). It is also contemplated that other frequencies of the electromagnetic spectrum (such as Radar, Masers, etc) may be used and/or that other measuring devices may be used, such as a camera which may be used in place of an optical triangulation probe to generate an image of the surface. It should be appreciated that all measurements and characteristics may then be generated using the same (or similar) methods and/or algorithms as discussed herein. For the internal measurements, the major diameter may be measured to assure clearance of maximum material conditions of the major diameter of external threads. It is further contemplated that the product may be associated with the product retention device 2012 using any method/device suitable to the desired end purpose, such as by hand or by a device configured to perform such a task. It is also contemplated that the components herein may be configured differently to obtain the desired end result. For example, although the measuring probe 2002 is illustrated as being movable and the product 2018 is illustrated as being stationary, it is contemplated that the measuring probe may 2002 be stationary and the product 2018 (or product retention device 2012) may be movable.

Figure 8:
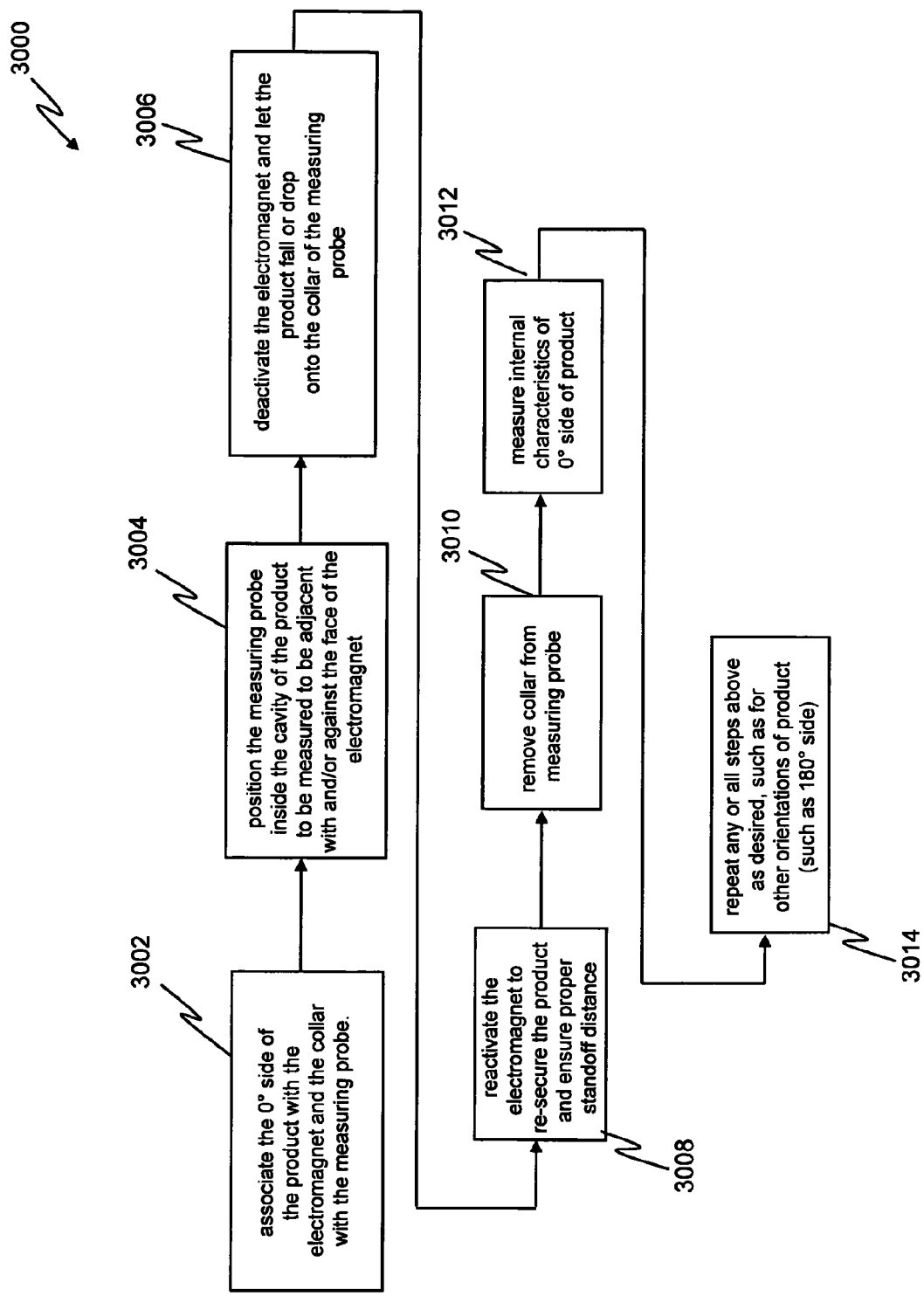
FIG. 8 shows a block diagram of an embodiment of a method for implementing the internal inspection system of FIG. 1.

Referring to FIG. 8, a block diagram illustrating one embodiment of a method 3000 for implementing the internal inspection system 2000 is shown and includes associating the product 2018 with the product retention device 2012 (via the electromagnet) and the measuring probe collar 2004 with the measuring probe 2002 to cover the emitter/receiver portion 2014, as shown in operational block 3002. The measuring probe 2002 is then positioned inside the cavity of the product 2018 to be measured to be adjacent with and/or against the face of the product retention device 2012, as shown in operational block 3004. The electromagnet of the product retention device 2012 is deactivated to let the 0° side of the product 2018 be located onto the measuring probe collar 2004 of the measuring probe 2002, as shown in operational block 3006. This aligns and centers the product and assures the proper standoff distance (which in this embodiment is the width of the measuring probe collar 2004). The electromagnet of the product retention device 2012 is reactivated to re-secure the product 2018 and to ensure that the proper standoff distance between the measuring probe 2002 and the product 2018 is achieved and maintained, as shown in operational block 3008, and the measuring probe collar 2004 is positioned away from (at least partially) the emitter/receiver portion 2014 of the measuring probe 2002, as shown in operational block 3010. The measuring probe 2002 is then moved within the cavity to traverse at least a portion of the cavity to measure the physical characteristics of the surface (such as threads) of the product 2018 for the 0° side (or both the 0° side and 180° side for a system with a double measuring probe 2002), as shown in operational block 3012. It is contemplated that the probe 2002 may be moved into and/or out of the cavity of the product 2018 (once or multiple times as desired) during surface measurement. Any or all of the above operations may be repeated as desired for the same or for other orientations of the product 2018 (180° side), as shown in operational block 3014.

In accordance with an exemplary embodiment, it is contemplated that multiple measurements may be made at each of the measurement locations in a manner responsive to component thread specifications or other factors. Moreover, the data may be processed to comprise a plurality of discrete pixel elements. The processing device 2010 may examine each pixel (or selected pixels) of the plurality of discrete pixel elements to determine the physical characteristics of the surface as discussed hereinabove. It is further contemplated that the data may be displayed (as an image or other output) via any display device suitable to the desired end purpose, such as a paper printout, a computer screen, a television, a plasma display and/or a Liquid Crystal Display (LCD). Although the component physical characteristics are determined by processing the data as discussed hereinabove, the component physical characteristics may be determined by processing the data using any device and/or method suitable to the desired end purpose. Inspection system 2000 may also be operated and/or monitored via a network connection, such as a wireless network (cellular, pager, RF), Local Area Network, Wide Area Network, Ethernet and/or Modem.

It is further contemplated that processing device 2010 may cause the data and/or measurement results to be stored in a data storage device and/or a volatile memory of the processing device 2010 (e.g. RAM). It should also be noted that the data may be stored in a volatile and/or a non-volatile memory location which may be disposed in any location suitable to the desired end purpose, such as a remote server. In addition, the data storage device may be used to store individual component data and/or group component data which may be specific to a desired purpose, such as data for a specific user, component part and/or a specific end user device, wherein the component data may include a large range of information, such as user specific data and/or component part history data.

It is further contemplated that the system 2000 may include a display device, such as a flat panel display device, for displaying obtained or resultant data (such as an image). Although the display device is described herein above as being a flat panel display, the display device may be any display device suitable to the desired end purpose. Additionally, although the processing device 2010 may be a computer system operating an MS Windows operating system (or higher version), the processing device 2010 may be any processing device suitable to the desired end purpose. Although measuring probe locating device 2006 may include a stage with a glass slide and a linear motor having crossed rollers with anti-creep technology, any measuring probe locating device 2006 suitable to the desired end purpose may be used. The linear motor may allow for sufficient travel in any direction to accomplish the desired measurement (for example, plus and minus five (5) inches of travel in any desired direction). Measuring probe locating device 2006 may also be configured to operate via a hardwired and/or a wireless controller and may be capable of supporting movement in the X, Y and/or Z axis, as shown in FIG. 7b.

As is known, a typical component thread is a combination of a thread ridge and thread groove, typically of uniform section, that is produced by forming a groove with a helix on an external or internal surface of a cylinder or cone. Because the component thread is designed to operate in association with an opposing component thread, it is essential that certain key physical characteristics relating to thread size and thread form be tightly controlled. Deviation from acceptable tolerances of these key characteristics can result in catastrophic failure of the system and/or loss of life. As such, it is desirable to measure these thread size characteristics and thread form characteristics as accurately as possible. The thread size characteristics include the major diameter, the minor diameter, the functional diameter and the pitch diameter and the thread form characteristics include the pitch, the lead, the uniformity of helix angle, the flank angle and the included angle, each one of which is discussed in more detail herein.

Figure 9:
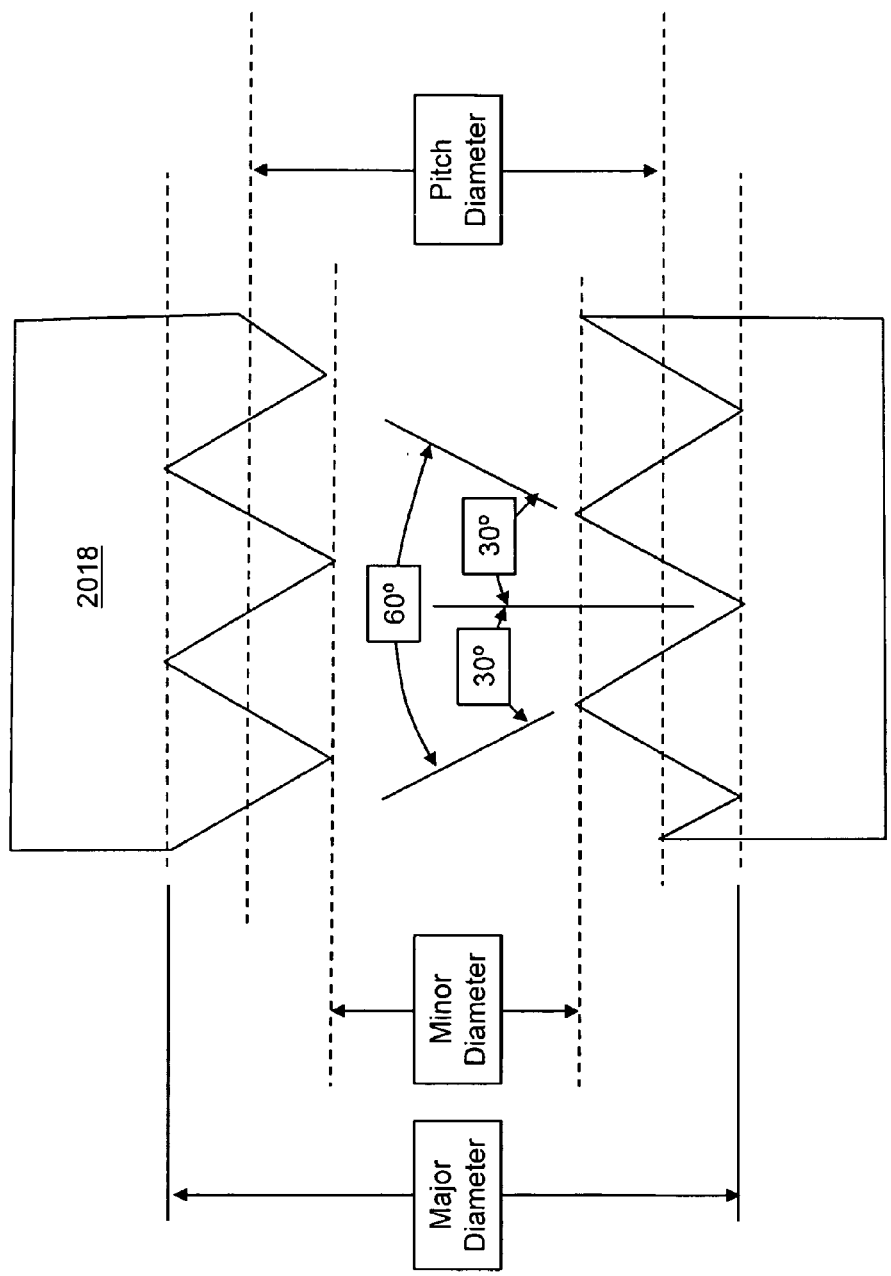
FIG. 9 shows a side sectional view of an exemplary internally threaded component.
Figure 10:
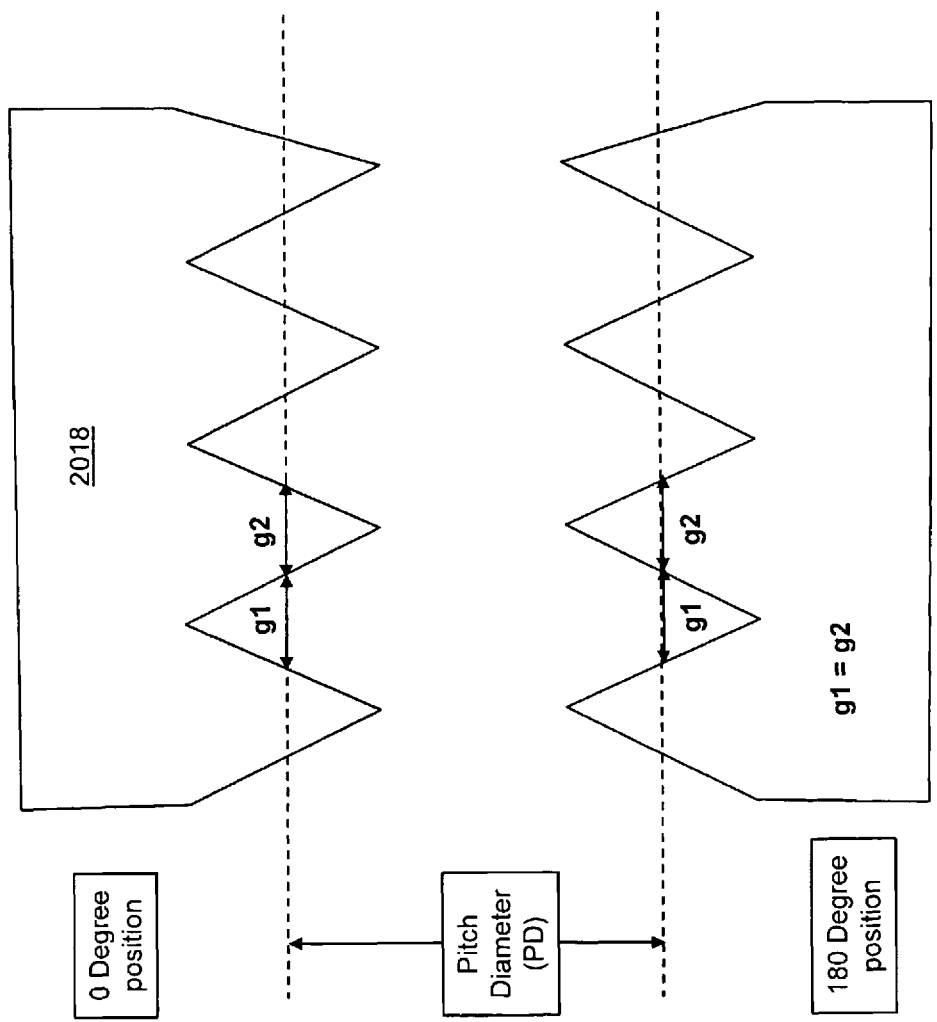
FIG. 10 show a side sectional view of an exemplary internally threaded component.

Referring to FIG. 9 and FIG. 10, side sectional views of an internally threaded component 2018 is shown and discussed. The major diameter of the component is the diameter or width of an imaginary cylinder, called the major cylinder, whose surface would be parallel to the straight axis of the component and whose surface would bound the roots of an internal thread. As such, a threaded ring gage includes a clearance diameter and a threaded product includes a full form major diameter. The full form major diameter, for both an internally threaded gage and an internally threaded product, may be defined as a composite measurement responsive to the major radius (which may be defined as the distance between the component axis and one surface of the major cylinder or one half of the major diameter) measured on the 0° side of the full form threads and the major radius measured on the 180° side of the full form threads. The minor diameter of the component is the diameter of an imaginary cylinder, or minor cylinder, whose surface would be parallel to the straight axis of the component and whose surface would bound the crests of an internal thread.

The pitch of an internal thread having uniform spacing may be defined as the distance, measured parallel to the axis, between corresponding points on adjacent thread forms in the same axial plane and on the side of the axis. Thus, the pitch may be defined as the number of threads per inch (TPI) and the pitch distance may be defined as 1/TPI, wherein TPI is measured parallel to the thread axis, from a point on one flank to the corresponding point on the next available flank. The pitch diameter of the component is the diameter or width of an imaginary cylinder, called the pitch cylinder, whose surface would be parallel to the axis of the thread or component and whose surface would intersect the profile of a straight thread such that the width of the thread ridge and the thread groove are equal.

The lead may be defined as the axial distance moved by the component in relation to the amount of angular rotation, when a threaded component is rotated about its axis with respect to a fixed mating thread. Thus, the lead is the amount of axial travel when the threaded component is turned one full turn or 360° and pitch is the distance measured parallel to the axis from a point on one flank to the corresponding point on the adjacent flank. Any deviation in lead tends to decrease the functional diameter of the internal thread and rapidly consumes the allowed operating pitch diameter tolerance of a threaded component. A deviation in lead may result in non-engagement of a thread with its mating part at all but a few points. Thus, when the threaded parts are assembled, and torque is applied, the result is pressure being applied to only a few, and possibly only one pressure flank. As such, any deviation in lead may produce a non-engagement condition for some threads and cause a failure in engaging threads at the point of pressure flank engagement due to non-engagement.

The helical path deviation of a thread is a wavy deviation from a true helical advancement or a non-uniformity of helix angle. In a similar manner as the lead, a deviation in the helical path causes a decrease in the functional size of the internally threaded component in proportion to the amount of waviness. Thus, all of the statements that were made concerning a deviation in lead also apply to a deviation in helical path and similarly, a deviation of helical path may result in partial engagement of the thread flanks with the result that torque pressures may not be evenly distributed and may result in pre-load relaxation.

The included angle of a thread is the angle between the flanks of the thread measured in an axial plane. The flank angles are the angles between the individual flanks and the perpendicular to the axis of the thread measured in an axial plane. A flank angle of a symmetrical thread is commonly referred to as the half included angle or the half angle of a thread. A deviation in the flank angle may result in a failure of the thread when the product is exposed to line loads, when torque is applied or when vibration occurs. This is because an improper flank engagement may create an unevenly distributed pressure load along the flank rather than the pressure load being distributed evenly along the flank.

Other important physical characteristics of a typical component thread include the functional size diameter, the taper characteristic of the pitch cylinder and the out-of-roundness, all of which can generate a non-engagement condition. In fact, distortion or deviation from specifications of any of the physical characteristics discussed herein may cause varying degrees of non-engagement.

The functional, or virtual, diameter of an internal thread may be defined as the resultant size of the product thread taking into account the effect of lead, helical path deviation, flank angle deviation, taper and out-of-roundness. As such, it may be seen that the functional diameter is the pitch diameter of the enveloping thread of perfect pitch, lead and flank angles, having full depth of engagement, but that are clear at crests and roots, of specified lengths of engagement. For an internal thread, the functional diameter may be derived by subtracting the cumulative effects of deviations to the pitch diameter, including variations in lead and flank angles over a specified length of engagement. Thus, it should be clear that the effects of taper, out-of-roundness and surface defects may be positive or negative on the functional size of the internal threads.

The taper characteristic of the pitch cylinder is simply a tapering of the pitch cylinder of the thread. Thus, a tapered thread fails to give a complete thread engagement, which may lead to a product failure caused by uneven torque pressure conditions on pressure flanks and pre-load relaxation.

The out-of-roundness of the pitch cylinder, which is any deviation of the pitch cylinder from round, limits the thread engagement and allows for only line contact with the mating thread and typically includes two types of out-of-roundness: Multi-lobe or Oval.

With the exemplary physical characteristics of a threaded component to be measured explained hereinabove, an overall exemplary of a method for measuring these characteristics is provided and described hereinbelow. Furthermore, it is contemplated that each of the methods, calculations and algorithms described herein, may be performed via a system operator and/or via an automated system.

In this embodiment, once data for the surfaces being measured (i.e. the 0° and 180° sides of the threads) is obtained, the Flank angle may be determined. Using the data, the minor radius, the major radius, the pitch radius, the lead pitch, the leading/trailing flank angles and/or the included angles can be determined. The major radius may be determined via the major diameter, which is a composite measurement based on the major radius of the 0° and corresponding 180° side of the threads. Thus, the major radius can be determined by summing the individual measurements and dividing by the number of measurements collected. The number of measurement locations may be determined by taking 70% of the thread width, as given by thread tables, and centering them on the center of the thread. This major radius average may then be combined from both the 0° and the 180° sides to get the major diameter. The pitch diameter calculation, which is based on the leading and trailing angles, major diameter, pitch lead and crest width at the location in question, may be determined by the equation:

$$PD=MD-(Cot(PL/2)-CW),$$

where, PD is pitch diameter, MD is major diameter, PL is pitch lead and CW is crest width. The lead front measurement, which is responsive to the difference between the groove distance and the ridge distance along the leading/trailing/leading flanks may be determined by various known methods.

Figure 11:
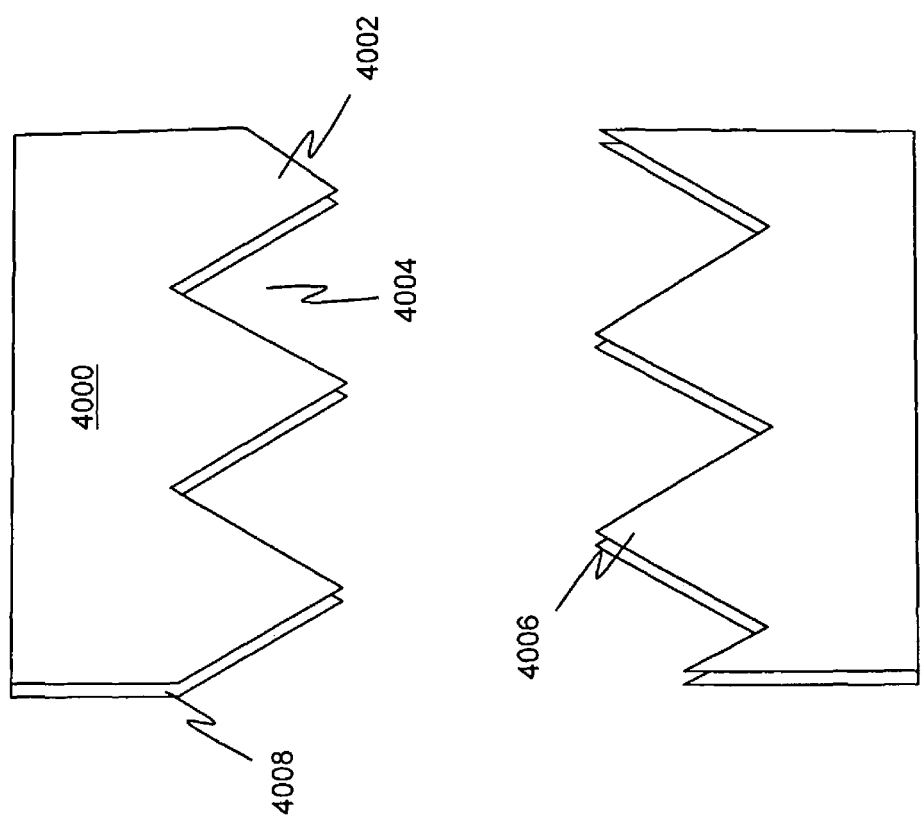
FIG. 11 illustrates a representation of the thread image of an exemplary internally threaded component showing data aberration (shadow image)

In an additional embodiment, the determination of the Pitch Diameter (PD) may include a Correction Factor (CF) to adjust for any aberrations that may be present in the data. Referring to FIG. 11, for illustration purposes a symmetrically internally threaded object 4000 is shown having a plurality of threads 4002. The Pitch Diameter (PD) for the threaded object 4000 having thread grooves 4004 and thread ridges 4006 may be described simply as the distance between a point on the 0° side of the object and the 180° of the object where the width of the thread ridge, $g_1$, and the thread groove, $g_2$, are equal (See FIG. 10). However, in some cases, as the Laser beam is reflected from the surface being measured, unwanted reflections may fall incident upon the sensing device of the measuring probe 2002 causing aberrations in the data. As such, the data generated may include data responsive to unwanted higher and/or lower order reflections and thus the physical characteristics of the object 4000, such as the Pitch Diameter (PD) may be skewed and inaccurate, as represented by the shadow image 4008.

To compensate for any aberrations of the shadow image 4008 within the image data, a Correction Factor (CF) may be generated and applied to the process for determining the Pitch Diameter (PD). As such, the Pitch Diameter (PD) may be represented by the equation:

$$PD_{Final}=PD_{Observed}-CF,$$

wherein $PD_{Final}$ is the Pitch Diameter (PD) adjusted for any aberrations, $PD_{observed}$ is the Pitch Diameter (PD) as measured and containing any aberrations and CF is the Correction Factor (CF) representing any aberrations.

Figure 12:
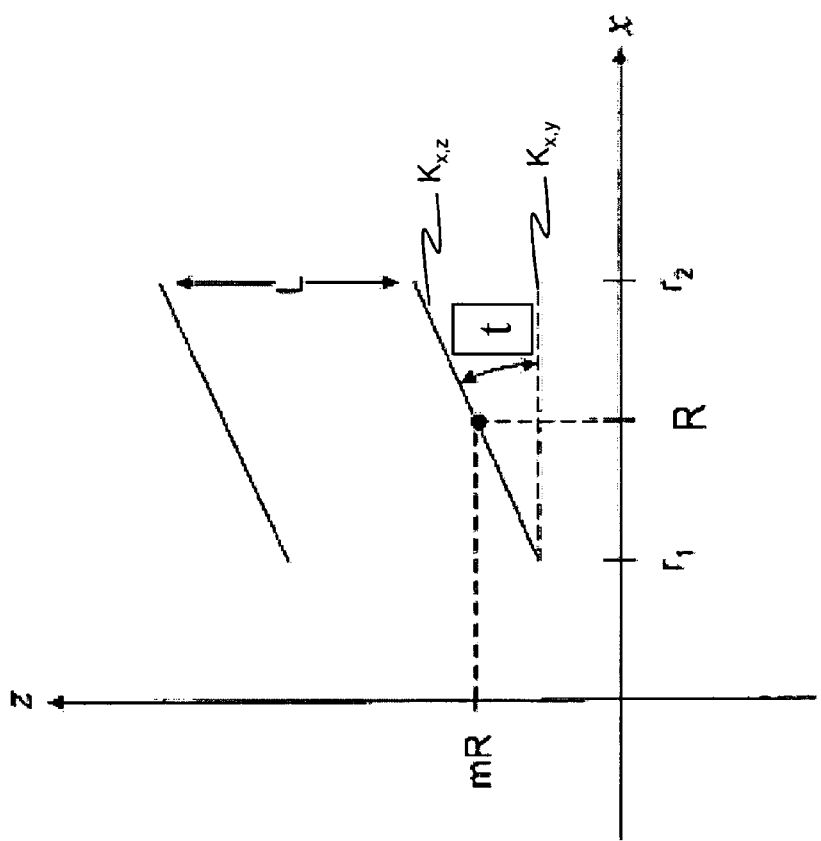
FIG. 12 is a graph of the x-z plane showing a parametric representation of the embedding of the flank of an exemplary internally symmetrically threaded component onto the x-z plane.

For example, as illustrated for internal threads, one embodiment for compensating for any aberrations includes generating a Correction Factor (CF) responsive to unwanted reflections or 'splash' and 'subtracting' the Correction Factor (CF) from the data generated by the sensing device, wherein the Correction Factor (CF) may be determined by parametrically representing one flank of a thread (i.e. the rear side of a thread ridge) in 3-D space having an x-axis, a y-axis and a z-axis as an embedding of a strip into a 2-D space having only the x-axis and the z-axis. Referring to FIG. 12, for objects or components having symmetrical threads, using only two variables (r, t), a first point, $r_1$, representing the minor diameter of the thread on the x-z axis, and a second point, $r_2$, representing the major diameter of the thread on the x-z axis, is shown in the x-z plane connected via a straight line, $K_{x-z}$, which is drawn between the two points $r_1$ and $r_2$. The variable R is the 2-D representation of the Pitch Diameter (PD) in the x-z plane and t is the flank angle which may be represented as the angle between the line $K_{x-z}$ drawn between the two points, $r_1$ and $r_2$, in the x-z plane and the projection $K_{x-y}$ of the line $K_{x-z}$ onto the x-y plane. Additionally, the variable $L_{x-z}$ is the lead angle of the thread and the variable m is the tangent of the flank angle, t. The variable r is a point on the x-z plane which represents the distance between the z-axis and a point on the line $K_{x-z}$ and thus may range from half of the minor diameter to half of the major diameter. As such, we can parameterize the above relationships using the following equations:

$$x=r\cos(t),$$

$$y=r\sin(t), \text{ and}$$

$$z=mr+Lt/2\pi.$$

This embedding can then be projected onto the x-z plane by using the equations:

$$x=r\cos(t), \text{ and}$$

$$z=mr+Lt/2\pi,$$

to obtain the determinant of the Jacobian matrix, wherein the Jacobian matrix is defined by:

$$J(x1 \ldots xn) = \begin{bmatrix} \frac{\partial z1}{\partial x1} & \cdots & \frac{\partial z1}{\partial xn} \\ \vdots & \ddots & \vdots \\ \frac{\partial zn}{\partial x1} & \cdots & \frac{\partial zn}{\partial xn} \end{bmatrix}.$$

As is well known, the Jacobian matrix is the matrix of all first-order partial derivatives of a vector-valued function and may be representative of the 'best' linear approximation to a differential function near a given point.

Thus, using the equations as derived hereinabove, $$x=r\cos(t), \text{ and}$$

$$z=mr+Lt/2\pi,$$

the Jacobian matrix $J(x_1 \ldots x_n)$ may be represented as:

$$J(x1 \ldots xn) = \begin{bmatrix} \cos(t) & -r\sin(t) \\ m & L/2\pi \end{bmatrix}.$$

Solving the Jacobian matrix $J(x_1 \ldots x_n)$ to find the set of points of the shadow image (i.e. ribbon) on the x-z plane gives the following:

$$J=((L/2\pi)\cos(t)+mr\sin(t))=0$$

where, $$r=-(L/(2\pi m \tan(t))).$$

Figure 13:
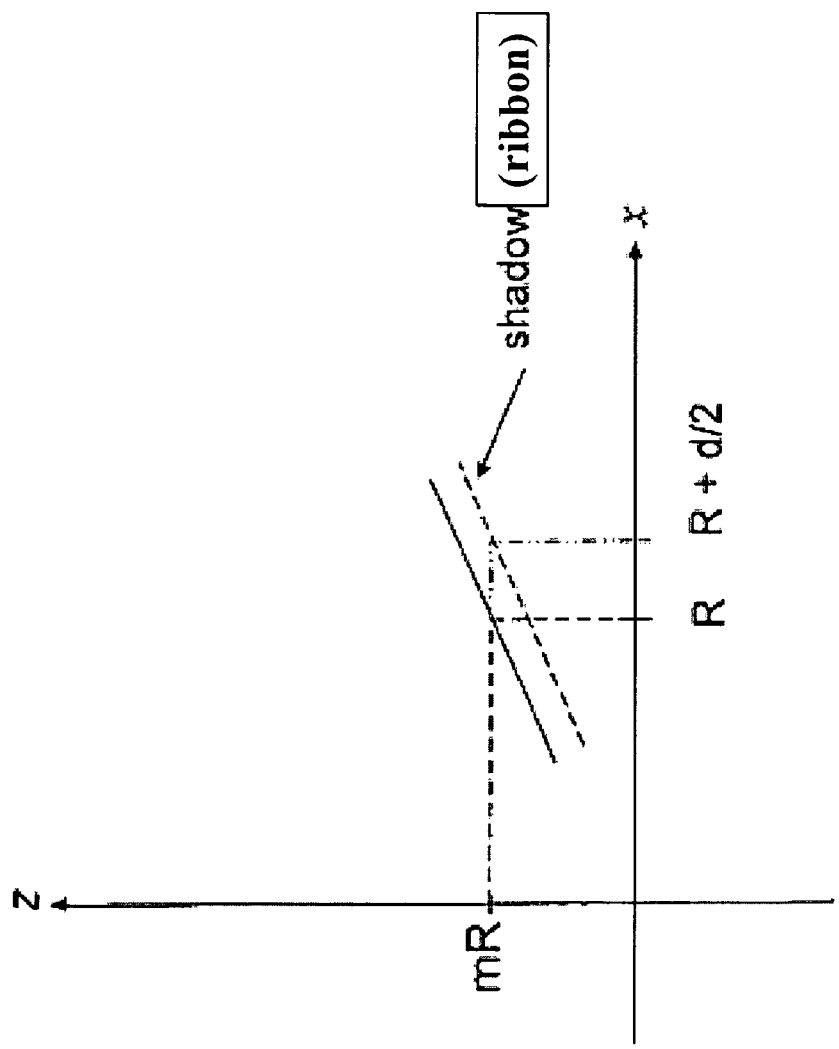
FIG. 13 is a graph of the x-z plane showing a parametric representation of the embedding of the flank of an exemplary symmetrically threaded component onto the x-z plane, including an aberration.

Referring to FIG. 13, if the value of R is set to half of the Pitch Diameter (PD) of the thread, the point on the projection of the ribbon (i.e. shadow image) that is directly to the "right" of the point where r=R and t=0 may be determined. This is a point on the ribbon that has the same z-coordinate as the Pitch Diameter (PD) point (x,y,z)=(R,0,mR) and thus, it can be seen that at the Pitch Diameter (PD) point (x,y,z), z=mR. Plugging z=mR into the equation for z gives the following:

$$z = mR = mr + \frac{Lt}{(2\pi m)},$$

$$r = R - \frac{Lt}{(2\pi m)},$$

and combining equation (1) with equation (2) gives the following:

$$\frac{-L}{2\pi m \tan(t)} = R - \frac{Lt}{2\pi m},$$

and $$L + (2\pi mR - Lt)\tan(t) = 0,$$

which must be solved for each given value of L, m and R. Having the flank angle, t, these equations may be solved to obtain r, wherein half of the displacement of the Pitch Diameter (PD) is the x-coordinate of the point on the ribbon minus the x-coordinate of the Pitch Diameter (PD) point (x,y,z)=(R, 0,mR) or simply, r cos(t)−R. Thus, it should be appreciated that the Correction Factor (CF) may be assumed to be twice this amount and may be given by the equation:

$$CF = 2(r\cos(t) - R).$$

Thus, the Pitch Diameter for a symmetrically internally threaded object adjusted for any aberrations, $PD_{Final}$, may be determined by applying the Correction Factor (CF) above into equation (1) to give the following equation:

$$PD_{Final} = PD_{Observed} - 2(r\cos(t) - R),$$

In a similar fashion, for objects or components having asymmetrical threads, such as buttress threads, the methodology applied hereinabove may be used for both flanks (due to the asymmetry the calculations should be conducted for each flank). As such, a simple geometric argument using the above approach for both flanks may combine the two results in a kind of weighted average to give:

$$CF = \frac{(d1\tan(a1) + d2\tan(a2))}{(\tan(a1) + \tan(a2))},$$

wherein d1 and d2 are the shadow corrections for the two flank angles treated separately as symmetrical internal threads and a1 and a2 are the respective flank angles. Given the above, the Pitch Diameter for an asymmetrically internally threaded object adjusted for any aberrations, $PD_{Final}$, may be determined by applying the Correction Factor (CF) above into equation (1) to give the following equation:

$$PD_{Final} = PD_{Observed} - \frac{(d1\tan(a1) + d2\tan(a2))}{(\tan(a1) + \tan(a2))}.$$

Figure 14:
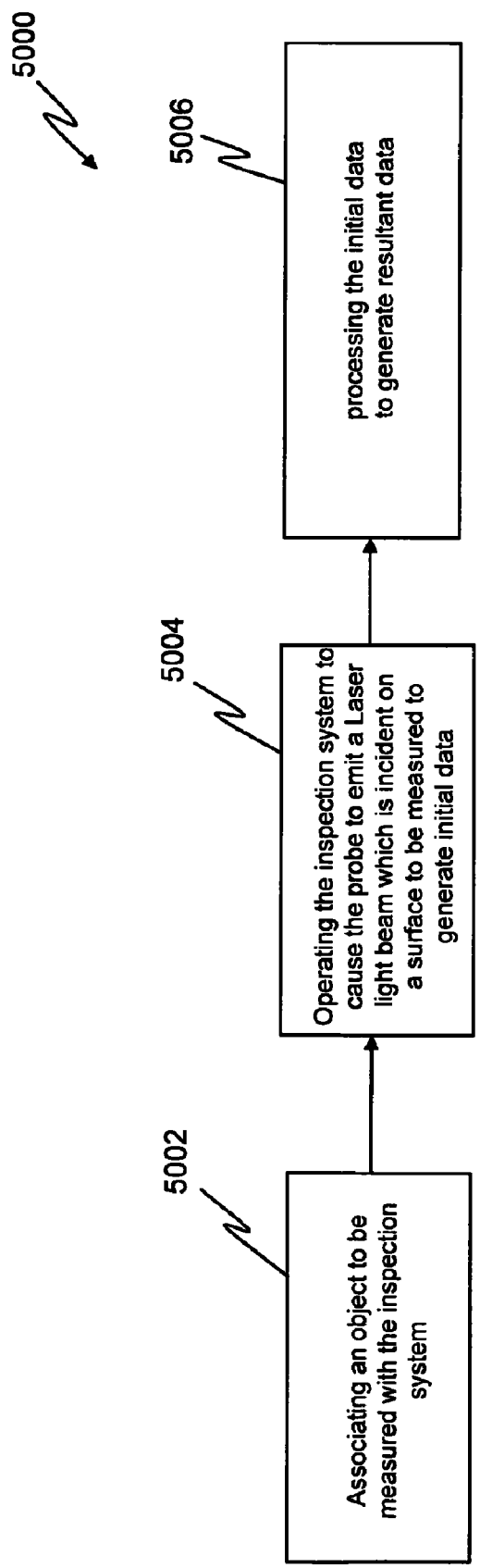
FIG. 14 is a block diagram illustrating an embodiment of a method for measuring the physical characteristics of an internally threaded component using the component inspection system of FIG. 1.

Referring to FIG. 14, a block diagram illustrating an embodiment of a high level method 5000 for measuring the physical characteristics of an internally threaded component using an inspection system 2000 is shown and includes associating an object with the inspection system 2000, as shown in operational block 5002. The inspection system 2000 is operated to cause the measuring probe 2002 to emit a Laser light beam which is incident upon a surface to be measured, as shown in operational block 5004, causing a reflected Laser beam to be at least partially incident upon the sensing device of the measuring probe 2002. In response initial data is generated/obtained. This initial data is processed to generate resultant data responsive to ut least one of a plurality of physical characteristics of the component 2018, as shown in operational block 5006, wherein the initial data may be processed responsive to at least in part to the algorithm above to correct for any aberrations in the initial data. As discussed herein, the algorithm may be at least partially responsive to the type of component being measured. For example, if the object is an internally threaded object having symmetrical threads, then the predetermined algorithm may be at least partially responsive to the equation:

$$CF = 2(r\cos(t) - R),$$

However, if the object is an internally threaded object having asymmetrical threads, then the predetermined algorithm may be at least partially responsive to the equation:

$$CF = \frac{(d1\tan(a1) + d2\tan(a2))}{(\tan(a1) + \tan(a2))}.$$

Figure 15:
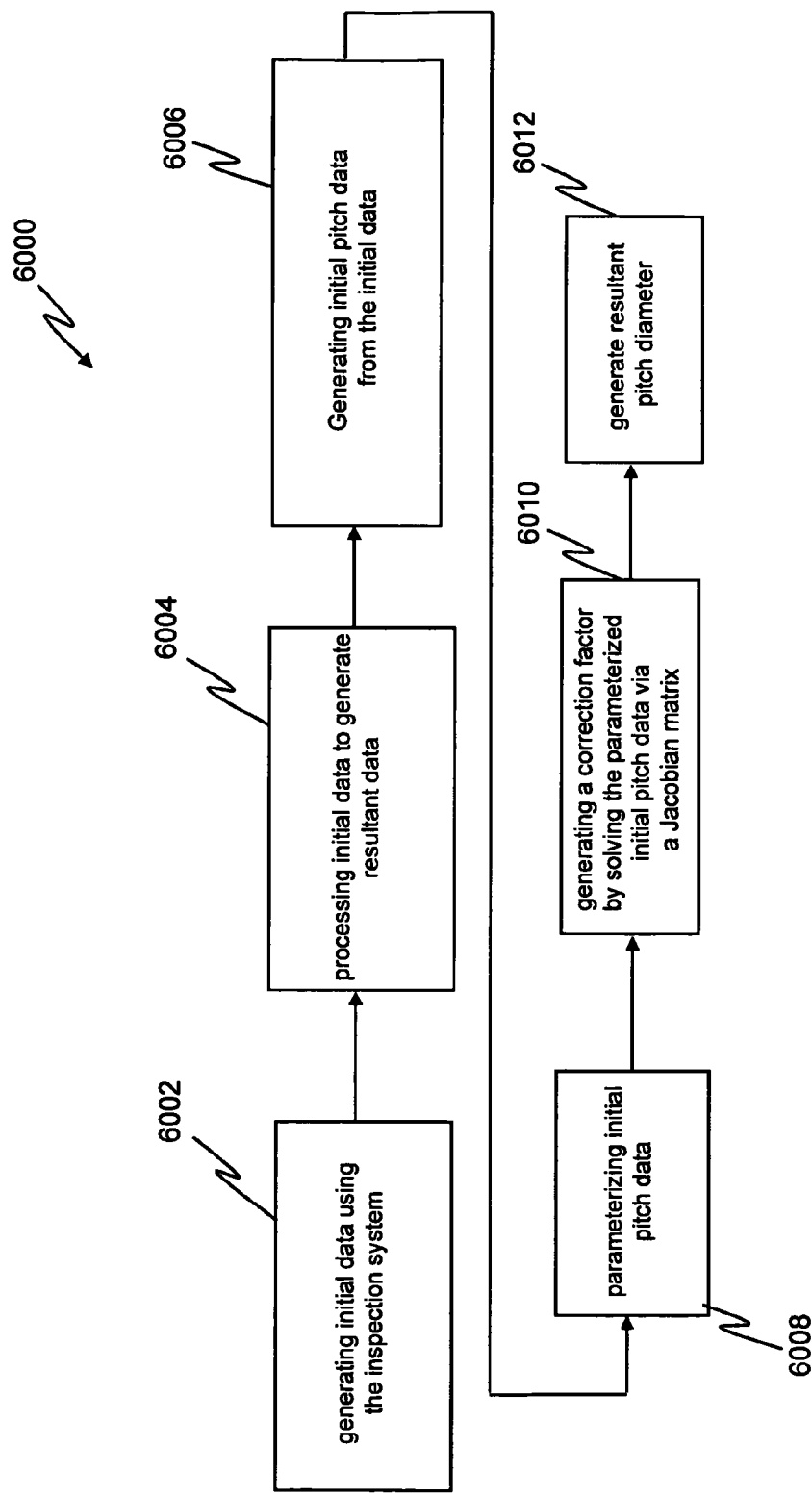
FIG. 15 is a block diagram illustrating an embodiment of a method for correcting aberrations in the data generated using the component inspection system of FIG. 1.

Referring to FIG. 15, a block diagram illustrating an embodiment of a method 6000 for correcting aberrations in data generated by inspection system 2000 is shown and includes generating initial data via the inspection system 2000, as shown in operational block 6002, wherein the sensing device of the measuring probe 2002 generates initial image data responsive to the surface being measured and any aberrations included with the reflected Laser beam. The initial image data may then be processed to generate resultant data, as shown in operational block 6004. This may be accomplished by generating initial Pitch Diameter (PD) data from the initial data, as shown in operational block 6006. This initial Pitch Diameter (PD) data is then parameterized, as shown in operational block 6008, and solved via a Jacobian Matrix, $J(x_1 \ldots x_n)$, where the Jacobian Matrix, $J(x_1 \ldots x_n)$, is solved responsive to a plurality of physical characteristics of the component to generate Correction Factor (CF) data, as shown in operational block 6010, wherein the plurality of physical characteristics may include at least one of the lead angle, the flank angle, the major diameter and the minor diameter. Once the Correction Factor (CF) data is determined, the initial Pitch Diameter (PD) data is processed responsive to the Correction Factor (CF) data to obtain the resultant Pitch Diameter (PD) data, as shown in operational block 6012. The multi thread lead, which is responsive to the distance between the lead front and the lead back measurements, the trailing angle and the included angle may be determined as known.

At this point, the $2^{nd}$ thread 0° side measurements, the $1^{st}$ full thread 180° side measurements may be conducted on the first full thread on the 180° side and the minor radius, the major radius, the pitch radius and the lead pitch may be determined. The $2^{nd}$ thread 180° side measurements may be made on the second full thread on the 180° side and the major radius, pitch radius and lead pitch may be determined. The component values and limits may be updated and the results may be stored, displayed to a system operator and/or printed out.

To account for anomalies in the measurements as described herein, the following novel and unique algorithms can be applied to the invention as disclosed herein and in U.S. Pat. Nos. 7,745,805, 7,777,209 and 7,227,163, the contents and disclosures of which are incorporated herein by reference in their entireties.

For 'smoothing' various parameters of the internally threaded component measurements (as desired), the following regression analysis approach may be used to obtain final smoothing data and includes:

1) Conduct a standard least square linear regression analysis;
2) Conduct a q-trimmed linear regression analysis; and
3) Conduct a resistant regression procedure.

This approach may be conducted in whole or in part and in any order desired and suitable to the desired end result. The terminal residuals outside of ±2 sigma standards may be generated and the refits may be generated. Accordingly, excessive deviations from the "true line" can be removed using at least one of two approaches as follows:

1) The first approach includes fitting a least squares line, which consists of minimizing, $$\sum_{k=1}^{n} w_k(y_k - (a + bx_k))^2,$$

where, a is the intercept of b, b is the determined/theoretical slope (can be estimated), k is the number of values generated, $x_k$ and $y_k$ are the residuals for each coordinate pair, $w_k$ is included/excluded least square lines fit, where the values of $w_k$ will be either zero (excluded) or one (included). Then determine the theoretical estimates for the slope b and the intercept a as follows, $$\hat{b} = \frac{S_{xy}}{S_{xx}} = \frac{\sum_{k=1}^{n} w_k(x_k - \bar{x})(y_k - \bar{y})}{\sum_{k=1}^{n} w_k(x_k - \bar{x})^2}, \hat{a} = \bar{y} - \hat{b}\bar{x},$$

where $\bar{x}$ and $\bar{y}$ are the means of the x and y coordinates and $\hat{a}$ and $\hat{b}$ are the estimates of a and b. From this estimate, the residuals may be calculated for each coordinate pair $(x_k, y_k)$ using, $$r_k = y_k - (\hat{a} + \hat{b}x_k).$$

This is the amount by which the data points differ from the corresponding points predicted to lie on the line and r(k) is the residual for each coordinate pair $x_k$, $y_k$. Sort the residuals from lowest to highest (or highest to lowest if desired) as given by, $$r_{(1)} \leq r_{(2)} \leq \ldots \leq r_{(n)}.$$

These values may be trimmed by identifying those points whose residuals have the highest absolute values and either remove them or weight them using a weight variable w. One way to generate the weight variable w is by setting $w_k=0$ for the points to be trimmed. Once this is done, the least squares line may be refit and used to determine the required parameters for the internally threaded component. Although as many as about 30% of the points may be trimmed, typically only about 5%-10% of the points are trimmed prior to the refit of the least squares line.

The second approach may include:
2) fitting the least squares line and calculating the residuals. However, this approach involves trimming those residuals outside of about 2 or 2.5 standard deviations given by, where n is the number of residuals, $$S = \sqrt{\frac{1}{n-1} \sum_{k=1}^{n} w_k(x_k - \bar{x})^2}$$

By using a two (2) standard deviation criterion, approximately about 5% of the data will be trimmed and the line can be refit by using the least squares estimates on the reduced data set. In both of the above approaches, the algorithm can be simply stated as, 1) Fit line to original data generated in accordance with the thread profile;
   a. Calculate residuals;
   b. Sort residuals;
   c. Trim data set;
      i. Fit line to trimmed data;
      ii. Calculate new residuals;
      iii. Sort new residuals;
      iv. Trim new data set;
2) Compute screw thread geometric parameters using re-trimmed data set.

To account for anomalies in the measurements as described herein, the following novel and unique algorithms can be applied to the invention as disclosed herein and U.S. Pat. Nos. 7,745,805, 7,777,209 and 7,227,163, the contents and disclosures of which are incorporated herein by reference in their entireties. It should be appreciated that the above approaches can be applied to all measurements including the major diameter, the pitch diameter, lead, angles, minor diameter, and helix variation. It is contemplated that, rather than using a least squares fit, another approach may use a minimum absolute deviation fit, where it is minimized by, $$\sum_{k=1}^{n} w_k |y_k - (a + bx_k)|.$$

It is also contemplated that an orthogonal least squares approach could also be used, i.e. measure the deviations perpendicular to the screw thread flank. However, the calculations for this approach are more complex. It should be further appreciated that the full data set should be retained and each point referenced by whether it is retained or trimmed. In particular, the higher the standard deviation of the residuals, the lower quality the screw thread.

To account for deviations in the functional size of the internally threaded component 2018, the following algorithm may be used:

Let avg=(leading flank+trailing flank)/2;
Let std=30 degrees standard flank angle (which may be represented in degrees or radians);
Let p=specified pitch=1/TPI (Threads per Inch);
Let dp=error in pitch=error in lead assuming 1 start thread (this can be positive or negative);
Let pd=actual measured pitch diameter;
Let L=|dp/tan(avg)| (absolute value may or may not be used as desired);

Let $A=|1.5*p*\tan(\text{avg}-\text{std})|$, where $\|\ \|$ means absolute value;

Let fs=functional size.

Thus, the functional size (fs) is represented by the value of pitch diameter plus the cumulative effect of all thread profile variations and is given by, $$fs = pd + L + A.$$

Accordingly, it should be appreciated that if there is no error (i.e. dp=0), then fs=pd. However, if error is present (i.e. dp=±) then fs=pd+L+A, where pd=pitch diameter of the thread profile, L=lead error of the thread profile and A=angle error of the thread profile.

In accordance with an exemplary embodiment, inspection system 2000 may be a self-calibrating and automated system for inspection of multiple components in a single fashion or an assembly line fashion. Moreover, inspection system 2000 allows for non-contact measurements which reduce and/or eliminate high inspection costs, operator feel, fatigue, uncertainties and/or error. Inspection system 2000 allows for the generation of automatic certificates and information output files. Moreover, inspection system 2000 may include built-in repeatability and reliability (R&R) qualification and testing programs and allow for an extremely fast measurement cycle.

An embodiment of a machine-readable computer program code and/or a medium encoded with a machine-readable computer program code for causing a controller to implement the methods disclosed herein (in whole or in part) via the inspection system 2000 is also provided, where the processing of the methods may be implemented via a controller that is disposed internal to, external to or internally and externally to the inspection system 2000. Thus, the controller may operate in response to a computer program where in order to perform the prescribed functions and desired processing, as well as the computations therefore (e.g. execution control algorithm(s), the control processes prescribed herein, and the like), the controller may includes, but not be limited to, a processor(s), computer(s), memory, storage, register(s), timing, interrupt(s), communication interface(s), and input/output signal interface(s), as well as combination comprising at least one of the foregoing.

The invention may be embodied in the form of a computer or controller implemented processes. The invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it will be understood by those skilled in the art that various changes may be made and equivalents may be substituted for elements thereof without departing from the scope of the invention. For example, although the internal inspection system is discussed herein in reference to a Laser frequency source, other measuring sources/devices (optical or non-optical) or combination of sources/devices suitable to the desired end purpose may be used, such as but not limited to collimated light, x-rays, cameras, borescope, MASER, electron-microscopes, etc. . . . . . In addition, modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. An inspection system for measuring at least a portion of the threaded surface of an internally threaded component, the inspection system comprising:

at least one measuring probe, wherein said at least one measuring probe includes an emitter and a receiver and is sized and shaped to be positionable adjacent to at least a portion of the threaded surface at an offset distance, wherein said emitter is configured to emit electromagnetic energy onto the threaded surface to generate reflected electromagnetic energy off of the threaded surface and wherein said receiver is configured to receive at least a portion of said reflected electromagnetic energy and generate threaded surface data;

a processing device, wherein said processing device is in signal communication with said measuring probe to receive said threaded surface data and process said threaded surface data to determine one or more physical characteristics of the threaded surface; and a component retention device, said component retention device being configured to have at least one active state and at least one inactive state, wherein said component retention device in said active state secures the internally threaded component in a fixed position relative to at least one said measuring probe and in said inactive state allows the internally threaded component to move in at least one plane, said component retention device being controllably actuated between said active and inactive states.

2. The inspection system of claim 1, wherein said at least one measuring probe includes two or more measuring probes.

3. The inspection system of claim 1, further comprising a measuring probe collar associated with at least one said measuring probe, wherein said measuring probe collar is configurable between a first configuration and a second configuration and wherein at least a portion of said measuring probe collar includes a collar width, said collar width being substantially equal to said offset distance.

4. The inspection system of claim 3, wherein said measuring probe collar in said first configuration establishes said offset distance between said associated measuring probe and the internally threaded component when said measuring probe is positioned adjacent to at least a portion of the threaded surface of the internally threaded component and said component retention device is in an inactive state, and when said measuring probe collar is in said second configuration, said measuring probe collar is positioned away from said emitter and said receiver of said measuring probe.

5. The inspection system of claim 3, wherein said component retention device is configured so that when said component retention device is in said active state, the internally threaded component is securely retained thereby and when said component retention device is in said inactive state, the internally threaded component is released and allowed to drop via gravity into contact with said measuring probe collar when said at least one measuring probe is positioned adjacent to the threaded surface of the internally threaded component.

6. The inspection system of claim 1, wherein the component retention device includes an electromagnetic device, wherein said electromagnetic device is configured so that when said electromagnetic device is in said active state, said electromagnetic device is magnetized and the internally threaded component is securely retained thereby and when said electromagnetic device is in said inactive state, said electromagnetic device is de-magnetized and releases the internally threaded component for re-positioning and alignment thereof relative to at least one said measuring probe.

7. The inspection system of claim 1, wherein said processing device is in signal communication with said measuring probe via at least one of a hardwire connection, a fiber optical connection or a wireless connection.

8. A method for measuring the threaded surface of an internally threaded component using an inspection system, wherein the inspection system includes a measuring probe having an emitter and a receiver and is sized and shaped to be positioned adjacent to at least a portion of the threaded surface at an offset distance, wherein the emitter is configured to emit electromagnetic energy onto the threaded surface to generate reflected electromagnetic energy off of the threaded surface and wherein the receiver is configured to receive at least a portion of the reflected electromagnetic energy and generate threaded surface data, the method comprising:
    activating a component retention device to secure the internally threaded component in a fixed position relative to the measuring probe;
    positioning the measuring probe inside a cavity of the internally threaded component;
    deactivating the component retention device to cause the internally threaded component to be re-positioned relative to the measuring probe such that a desired offset distance and an alignment are formed between the measuring probe and the threaded surface of the internally threaded component;
    re-activating the component retention device to secure the new position of the internally threaded component relative to the measuring probe;
    operating the inspection system to generate threaded surface data about at least a portion of the threaded surface of the internally threaded component; and
    processing the threaded surface data to generate one or more physical characteristics of at least a portion of the threaded surface.

9. The inspection system of claim 1, further including at least two said emitters and at least two said receivers, wherein a first said measuring probe includes multiple said emitters and receivers.

10. The inspection system of claim 1, wherein at least on said measuring probe is rotatable, whereby threaded surface data on any portion of the threaded surface of the internally threaded component is obtainable.

11. The inspection system of claim 1, wherein at least one said measuring probe is configured to emit and receive electromagnetic energy using a laser or other light source that is visible or not visible.

12. The inspection system of claim 9, wherein said active and inactive states of said product retention device are achieved with the use of at least one among magnetic, friction-based, suction-based or clamping force.

13. The method of claim 8, further comprising providing a measuring probe collar on the measuring probe, positioning the measuring probe collar over the emitter and receiver during re-positioning of the internally threaded component relative to the measuring probe and moving the measuring probe collar away from the emitter and receiver after the internally threaded component is repositioned relative to the measuring probe.

14. The method of claim 13, further including forming the measuring probe collar to have a thickness that is equal to the offset distance, wherein when the component retention device is deactivated, the internally threaded component falls via gravity into contact with the measuring probe collar.

15. The method of claim 8, further including forming the component retention device with an electromagnetic device, activating the component retention device by magnetizing the electromagnetic device to securely retain the internally threaded component in a fixed position and deactivating the component retention device by de-magnetizing the electromagnetic device to release the internally threaded component.

16. The method of claim 8, further including associating a measuring probe collar with the measuring probe, wherein the measuring probe collar is configurable between at least a first position and a second position relative to the measuring probe and wherein at least a portion of the measuring probe collar includes a collar width that is equal to the offset distance.

17. The method of claim 16, further including positioning the measuring probe collar in the first position thereof when the measuring probe is positioned inside a cavity of the internally threaded component and the component retention device is deactivated, establishing the offset distance between the measuring probe and the internally threaded component.

18. The method of claim 17, further including allowing the internally threaded component to drop via gravity into contact with the measuring probe collar.

19. The method of claim 17, further including positioning the measuring probe collar in the second position thereof, wherein the measuring probe collar in the second position is positioned away from the emitter and receiver of the measuring probe.

20. A method of establishing a desired standoff distance between and aligning at least a portion of the threaded surface of an internally threaded component and a measuring probe of an inspection system in order to allow at least one physical characteristic of the threaded surface to be determined, the measuring probe including at least one electromagnetic energy emitter and at least one electromagnetic energy receiver, the inspection system including a measuring probe collar associated with the measuring probe, the measuring probe collar being movable relative to the measuring probe, at least a portion of the measuring probe collar having a width that is equal to the desired standoff distance, the method comprising:
    securing the position of the internally threaded component relative to the measuring probe;
    positioning the measuring probe inside a cavity of the internally threaded component;
    positioning the measuring probe collar at least partially between the internally threaded component and the measuring probe;
    allowing the internally threaded component to move into contact with the measuring probe collar and align at least a portion of the threaded surface of the internally threaded component with the measuring probe;
    re-securing the position of the internally threaded component relative to the measuring probe thereby establishing the desired standoff distance and alignment between at least a portion of the threaded surface of the internally threaded component and the measuring probe; and positioning the measuring probe collar away from at least one electromagnetic energy emitter and receiver of the measuring probe thereby allowing the inspection system to determine at least one physical characteristic of the threaded surface of the internally threaded component.

* * * * *

UNITED STATES PATENT AND TRADEMARK OFFICE
CERTIFICATE OF CORRECTION

PATENT NO. : 8,164,758 B2
APPLICATION NO. : 12/459983
DATED : April 24, 2012
INVENTOR(S) : S. P. Johnson et al.

It is certified that error appears in the above-identified patent and that said Letters Patent is hereby corrected as shown below:

In the Claims:

| COLUMN | LINE | ERROR |
|---|---|---|
| 19 (Claim 10) | 53 | "on" should read --one-- |

Signed and Sealed this
Third Day of September, 2013

Teresa Stanek Rea
*Acting Director of the United States Patent and Trademark Office*